United States Patent [19]

Matsuda

[11] Patent Number: 5,003,481
[45] Date of Patent: Mar. 26, 1991

[54] ANTI-SKID BRAKE CONTROL SYSTEM FOR AUTOMOTIVE BRAKE SYSTEM INCLUDING PROJECTION OF VEHICULAR SPEED REPRESENTATIVE DATA

[75] Inventor: Toshiro Matsuda, Kanagawa, Japan

[73] Assignee: Nissan Motor Company Limited, Yokohama, Japan

[21] Appl. No.: 239,816

[22] Filed: Sep. 2, 1988

[30] Foreign Application Priority Data

Sep. 4, 1987 [JP] Japan ............................... 62-220458

[51] Int. Cl.⁵ .................................................. B60T 8/32
[52] U.S. Cl. ............................ 364/426.02; 364/565;
324/162; 303/103; 303/105
[58] Field of Search ................. 364/426.02, 565, 566;
324/160–162; 303/95, 97, 103, 105, 109, 110;
180/197

[56] References Cited

U.S. PATENT DOCUMENTS

| | | | |
|---|---|---|---|
| 4,089,564 | 5/1978 | Öberg | 303/109 |
| 4,358,164 | 11/1982 | Bleckmann et al. | 364/426.02 |
| 4,430,714 | 2/1984 | Matsuda et al. | 303/105 |
| 4,569,560 | 2/1986 | Kubo | 303/116 |
| 4,596,052 | 6/1986 | Matsuda | 364/550 |
| 4,660,146 | 4/1987 | Kubo | 364/426.02 |
| 4,663,175 | 5/1987 | Kubo | 364/426.02 |
| 4,663,716 | 5/1987 | Kubo | 364/426.02 |
| 4,665,491 | 5/1987 | Kubo | 364/565 |
| 4,669,045 | 5/1987 | Kubo | 364/426 |
| 4,669,046 | 5/1987 | Kubo | 364/426 |
| 4,674,049 | 6/1987 | Kubo | 364/426.02 |
| 4,674,050 | 6/1987 | Kubo | 364/426.02 |
| 4,675,819 | 6/1987 | Fennel | 303/105 |
| 4,679,146 | 7/1987 | Kubo | 364/426 |
| 4,680,713 | 7/1987 | Kubo | 364/426.02 |
| 4,680,714 | 7/1987 | Kubo | 364/426.02 |
| 4,682,295 | 7/1987 | Kubo | 364/426.02 |
| 4,704,684 | 11/1987 | Kubo | 364/426.02 |
| 4,718,013 | 1/1988 | Kubo | 364/426 |
| 4,787,682 | 11/1988 | Muto | 303/109 |
| 4,818,037 | 4/1989 | McEnnan | 303/103 |

FOREIGN PATENT DOCUMENTS

3038211 4/1981 Fed. Rep. of Germany.
3644324 7/1987 Fed. Rep. of Germany.

*Primary Examiner*—Gary Chin
*Attorney, Agent, or Firm*—Foley & Lardner, Schwartz, Jeffery, Schwaab, Mack, Blumenthal & Evans

[57] ABSTRACT

An anti-skid brake control system derives a projected vehicular speed representative data by summing a time dependent acceleration and deceleration value and a latched wheel speed data which is periodically updated. The time dependent acceleration and deceleration value is derived by integrating a vehicular acceleration/deceleration gradient indicative data. According to one particular feature of the invention, the integrated value is reset for minimizing error to be accumulated at a given timing. For detecting reset timing of the integrated value, the instantaneous wheel speed data is continuously compared with a predetermined zone which is set about the projected vehicular speed representative data. Namely, resetting of the integrated value is performed by detecting entry of the wheel speed data into the predetermined zone.

21 Claims, 11 Drawing Sheets

ANTI-SKID BRAKE CONTROL SYSTEM FOR AUTOMOTIVE BRAKE SYSTEM INCLUDING PROJECTION OF VEHICULAR SPEED REPRESENTATIVE DATA

BACKGROUND OF THE INVENTION

1. Field of the Invention

The present invention relates generally to an anti-skid brake control system for an automotive brake system. More specifically, the invention relates to an anti-skid brake control system including a technique for deriving a projected vehicular speed with an improved precision level which is satisfactory for establishing precise anti-skid control.

2. Description of the Background Art

It is well known that vehicular braking performance becomes optimum when wheel slippage becomes a certain value, e.g. 10% to 20%. Therefore, as is well known, anti-skid or anti-lock brake control is generally performed for maintaining the wheel slippage within a predetermined optimal range. For this, wheel slippage is monitored for controlling operational modes of a vehicular braking system for increasing braking pressure in APPLICATION mode, holding braking pressure constant in HOLD mode and decreasing braking pressure in RELEASE mode. In the vehicular anti-skid brake control, the APPLICATION mode is selected in normal operational condition for allowing linearly decelerating the vehicle according to increasing of the braking pressure. Anti-skid control is initiated upon detection of wheel deceleration during braking operation, in a greater magnitude than a preset deceleration threshold to switch operational mode of the brake system from APPLICATION mode to HOLD mode. Therefore, at the initial stage of an anti-skid brake control cycle, the braking pressure is held constant at an increased pressure at which the wheel deceleration increased across the wheel deceleration threshold is obtained, in HOLD mode. Because of the increased pressure in this HOLD mode, wheel speed further decelerates at a greater rate than deceleration of the vehicle speed. Therefore, wheel slippage which represents a ratio of difference of the vehicle speed and the wheel speed versus the vehicle speed, becomes greater than a target speed which represents the optimal wheel speed for obtaining optimum vehicular braking characteristics. When the wheel slippage becomes greater than a wheel slippage threshold and thus the wheel speed becomes decreased across the target speed, operational mode of the brake system is again switched into the RELEASE mode for decreasing the braking pressure for resuming the wheel speed toward the target speed. By this, the wheel speed resumes across the target speed. Therefore, wheel acceleration increases across a preset acceleration threshold. Then, the mode is again switched into the HOLD mode. Because of decreased braking pressure, the wheel speed overshoots to increase across the vehicle speed and then decelerated to the vehicle speed. Accordingly, the wheel acceleration again decreases across the acceleration threshold. Then, mode is switched to APPLICATION mode again.

In the anti-skid control set forth above, it becomes necessary to monitor the vehicle speed for deriving the wheel slippage. It is possible to directly measure the vehicle speed by means of an appropriate sensor, such as a doppler sensor. However, such sensor is unacceptably expensive and therefor is not practical for use in the anti-skid control system in view of the cost. Therefore, it is usual way for monitoring the vehicle speed in anti-skid control to latch a wheel speed upon initiation of anti-skid control as vehicle speed representing data, because upon initiation of the anti-skid control where the wheel deceleration increased across the wheel deceleration threshold, is approximately coincident with the vehicle speed. This vehicle speed representing data will be hereafter referred to as "projected speed". Based on the latched value, a vehicle speed represented data is projected utilizing a given vehicle deceleration indicative gradient which can be derived in various ways.

In another approach, the projected vehicular speed representative data has been derived on the basis of a longitudinal acceleration exerted on the vehicular body. In case that the longitudinal acceleration is used as a parameter for deriving the projected vehicular speed representative data, slop on the road can influence for monitoring longitudinal acceleration as will be naturally appreciated. For instance, the vehicle is in hill-climbing, the forward acceleration can be smaller than that of actual value due to influence of backward component of gravity force. On the other hand, when the vehicle is in down-hill driving condition, the forward acceleration can be greater than that of the actual value due to influence of the forward component of gravity force. In order to avoid influence of such gravity force in measurement of longitudinal acceleration for improving accuracy in derivation of the projected vehicular speed representative data, Japanese Patent Second (examined) Publication (Tokko) Showa 48-27710 proposes correction of the measured longitudinal acceleration value with a correction value which is derived on the basis of a road slop angle indicative data obtained immediately before initiation of vehicular braking operation.

Such prior proposal is not satisfactory because it cannot follow slop angle variation during vehicular braking operation. For instance, when the braking operation is performed on the flat road condition and the vehicle then enters into slopped road, correction value derived with respect to flat road may not satisfactorily compensate the gravity force component.

Additionally, in either case, the gradient data as well as the projected vehicular speed representative data may contain error even after improvement of the precision level. Such error may be accumulated through operation to cause malfunction in anti-skid control.

SUMMARY OF THE INVENTION

Therefore, it is an object of the present invention to provide an anti-skid brake control system employing technologies for precisely deriving a projected vehicular speed representative data with minimizing error to be accumulated.

In order to accomplish aforementioned and other objects, an anti-skid brake control system, according to the present invention, derives a projected vehicular speed representative data by summing a time dependent acceleration and deceleration value and a latched wheel speed data which is periodically updated. The time dependent acceleration and deceleration value is derived by integrating a vehicular acceleration/deceleration gradient indicative data. According to one of particular feature of the invention, the integrated value is reset for minimizing error to be accumulated at a given timing. For detecting reset timing of the integrated value, the instantaneous wheel speed data is continuously compared with a predetermined zone which is set about the projected vehicular speed representative data. Namely, resetting of the integrated value is performed by detecting entry of the wheel speed data into the predetermined zone.

According to one aspect of the invention, a system for projecting a vehicular speed representative data on the basis of a wheel speed for use in a vehicular wheel slip control including an anti-skid control, traction control, comprises:

a sensor means for monitoring rotation speed of the vehicular wheel to produce a wheel speed indicative sensor signal representative of the rotation speed of the vehicular wheel;

a detector means for monitoring vehicular acceleration and deceleration representative parameter for deriving a vehicular speed variation gradient data based on the detected vehicular acceleration and deceleration representative parameter;

first means for latching a first wheel speed indicative value corresponding to instantaneous wheel speed indicative sensor signal values at a predetermined timing;

second means for deriving a time dependent vehicular speed variation data by integrating the vehicular speed variation gradient data;

third means for deriving a projected vehicular speed representing data based on the latched wheel speed indicative value and the time dependent vehicular speed variation data; and fourth means detecting the wheel speed indicative sensor signal value in a predetermined relationship with the projected vehicular speed representative data for generating a reset signal for resetting the time dependent vehicular speed variation data.

Preferably, the detector means monitors a longitudinal acceleration exerted on a vehicular body and produces a longitudinal acceleration indicative signal indicative of a magnitude of longitudinal acceleration and a direction of the longitudinal acceleration, which longitudinal acceleration indicative signal serves as the vehicular speed variation data.

In preferred construction, the fourth means detects the wheel speed indicative sensor signal value within a predetermined range defined about the projected vehicular speed representative data. The fourth means defines the predetermined range taking the projected vehicular speed representative data as a center value.

Alternatively, the detector means latches a first wheel speed indicative value corresponding to instantaneous wheel speed indicative sensor signal values at a predetermined timing in each skid cycle and periodically latches a second wheel speed indicative value corresponding to instantaneous wheel speed indicative value, for deriving a gradient data of vehicular speed variation on the basis of the latched first and second wheel speed indicative values and the interval of occurrences of latching of the wheel speed indicative values.

According to another aspect of the invention, an anti-skid brake control system for an automotive brake system comprises:

a hydraulic brake circuit having means for building up braking fluid pressure according to operational magnitude of a manually operable braking member, means, associated with a vehicular wheel, for generating braking force to decelerating the vehicular wheel;

a pressure adjusting means, disposed within the hydraulic circuit, for adjusting pressure of a working fluid to be delivered to the braking force generating means, the pressure adjusting means being operable at least in a first mode for increasing braking pressure in the braking force generating means and in a second mode for decreasing the braking pressure;

a sensor means for monitoring rotation speed of the vehicular wheel to produce a wheel speed indicative sensor signal representative of the rotation speed of the vehicular wheel;

a detector means for monitoring vehicular acceleration and deceleration representative parameter for deriving a vehicular speed variation gradient data based on the detected vehicular acceleration and deceleration representative parameter;

first means for latching a first wheel speed indicative value corresponding to instantaneous wheel speed indicative sensor signal values at a predetermined timing;

second means for deriving a time dependent vehicular speed variation data by integrating the vehicular speed variation gradient data;

third means for deriving a projected vehicular speed representing data based on the latched wheel speed indicative value and the time dependent vehicular speed variation data; and fourth means detecting the wheel speed indicative sensor signal value in a predetermined relationship with the projected vehicular speed representative data for generating a reset signal for resetting the time dependent vehicular speed variation data;

fifth means for controlling the pressure adjusting means between the first and second modes for maintaining the rotation speed of the vehicular wheel in a predetermined optimal relationship with the projected vehicular speed representative data.

According to a further aspect of the invention, an anti-skid brake control system for an automotive brake system comprises:

a hydraulic brake circuit having means for building up braking fluid pressure according to operational magnitude of a manually operable braking member, first braking force generating means, associated with a first vehicular wheel, for generating braking force to decelerating the first vehicular wheel, and second braking force generating means, associated with a second vehicular wheel, for generating braking force to decelerating the second vehicular wheel;

a first pressure adjusting means, disposed within the hydraulic circuit, for adjusting pressure of a working fluid to be delivered to the first braking force generating means, the pressure adjusting means being operable at least in a first mode for increasing braking pressure in the first braking force generating means and in a second mode for decreasing the braking pressure;

a second pressure adjusting means, disposed within the hydraulic circuit, for adjusting pressure of a working fluid to be delivered to the second braking force generating means, the pressure adjusting means being operable at least in a first mode for increasing braking pressure in the braking force generating means and in a second mode for decreasing the second braking pressure;

a first sensor means for monitoring rotation speed of the first vehicular wheel to produce a first sensor signal representative of the rotation speed of the vehicular wheel;

a second sensor means for monitoring rotation speed of the second vehicular wheel to produce a second sensor signal representative of the rotation speed of the vehicular wheel;

means for comparing the first and second sensor signal values for selecting one having greater value as common wheel speed indicative data;

a third sensor means for monitoring longitudinal acceleration exerted on a vehicular body for producing a longitudinal acceleration indicative sensor signal;

a gradient data derivation means for deriving a vehicular speed variation gradient data based on the longitudinal acceleration indicative sensor signal value;

first means for latching a first wheel speed indicative value corresponding to instantaneous wheel speed indicative sensor signal values at a predetermined timing;

second means for deriving a time dependent vehicular speed variation data by integrating the vehicular speed variation gradient data;

third means for deriving a projected vehicular speed representing data based on the latched wheel speed indicative value and the time dependent vehicular speed variation data; and fourth means detecting the wheel speed indicative sensor signal value in a predetermined relationship with the projected vehicular speed representative data for generating a reset signal for resetting the time dependent vehicular speed variation data; and fourth means for controlling the pressure adjusting means between the first and second modes for maintaining the rotation speed of the vehicular wheel in a predetermined optimal relationship with the projected vehicular speed representative data.

According to a still further aspect of the invention, an anti-skid brake control system for an automotive brake system comprises:

a hydraulic brake circuit having means for building up braking fluid pressure according to operational magnitude of a manually operable braking member, means, associated with a vehicular wheel, for generating braking force to decelerating the vehicular wheel;

a pressure adjusting means, disposed within the hydraulic circuit, for adjusting pressure of a working fluid to be delivered to the braking force generating means, the pressure adjusting means being operable at least in a first mode for increasing braking pressure in the braking force generating means and in a second mode for decreasing the braking pressure;

a sensor means for monitoring rotation speed of the vehicular wheel to produce a sensor signal representative of the rotation speed of the vehicular wheel;

first means for detecting a predetermined vehicular braking condition satisfying a predetermined anti-skid brake control condition for initiating anti-skid control operation;

second means for latching a first wheel speed indicative value corresponding to instantaneous wheel speed indicative sensor signal values at a predetermined timing in each skid cycle and periodically latching a second wheel speed indicative value corresponding to instantaneous wheel speed indicative value, for deriving a gradient data of vehicular speed variation on the basis of the latched first and second wheel speed indicative values and the interval of occurrences of latching of the wheel speed indicative values;

third means for deriving a time dependent vehicular speed variation data by integrating the vehicular speed variation gradient data;

fourth means for deriving a projected vehicular speed representing data based on the latched wheel speed indicative value and the time dependent vehicular speed variation data; and fifth means detecting the wheel speed indicative sensor signal value in a predetermined relationship with the projected vehicular speed representative data for generating a reset signal for resetting the time dependent vehicular speed variation data;

sixth means for controlling the pressure adjusting means between the first and second modes for maintaining the rotation speed of the vehicular wheel in a predetermined optimal relationship with the projected vehicular speed representative data.

According to a yet further aspect of the invention, an anti-skid brake control system for an automotive brake system comprises:

a hydraulic brake circuit having means for building up braking fluid pressure according to operational magnitude of a manually operable braking member, means, associated with a vehicular wheel, for generating braking force to decelerating the vehicular wheel;

a pressure adjusting means, disposed within the hydraulic circuit, for adjusting pressure of a working fluid to be delivered to the braking force generating means, the pressure adjusting means being operable at least in a first mode for increasing braking pressure in the braking force generating means and in a second mode for decreasing the braking pressure;

a sensor means for monitoring rotation speed of the vehicular wheel to produce a sensor signal representative of the rotation speed of the vehicular wheel;

first means for detecting a predetermined vehicular braking condition satisfying a predetermined anti-skid brake control condition for initiating anti-skid control operation;

second means for latching a first wheel speed indicative value corresponding to instantaneous wheel speed indicative sensor signal values at a predetermined timing in each skid cycle and periodically latching a second wheel speed indicative value corresponding to instantaneous wheel speed indicative value, for deriving a gradient data of vehicular speed variation on the basis of the latched first and second wheel speed indicative values and the interval of occurrences of latching of the wheel speed indicative values;

second means for deriving a time dependent vehicular speed variation data by integrating the vehicular speed variation gradient data;

third means for deriving a projected vehicular speed representing data based on the latched wheel speed indicative value and the time dependent vehicular speed variation data; and fourth means detecting the wheel speed indicative sensor signal value in a predetermined relationship with the projected vehicular speed representative data for generating a reset signal for resetting the time dependent vehicular speed variation data;

fifth means for monitoring preselected gradient correction factor for deriving correction value based thereon for modifying the gradient data with the correction value;

sixth means for monitoring road friction varying across a predetermined road friction criterion to operate the second means for updating the latched first wheel speed indicative value with the latched second wheel speed indicative value;

seventh means for controlling the pressure adjusting means between the first and second modes for maintaining the rotation speed of the vehicular wheel in a predetermined optimal relationship with the projected vehicular speed representative data.

DESCRIPTION OF THE PREFERRED EMBODIMENT

Figure 1A:
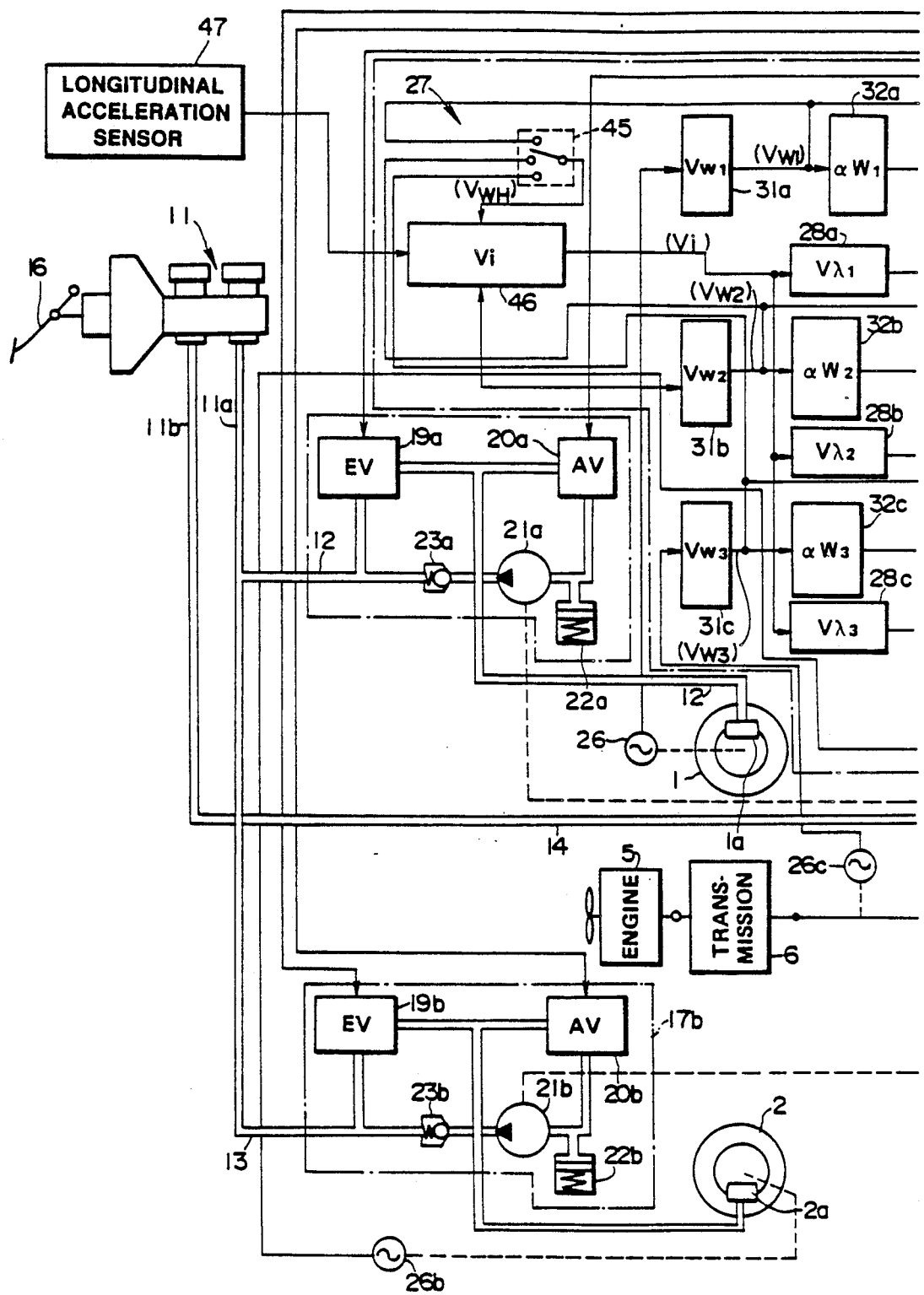
FIGS. 1(A) and 1(B) are block diagram of an overall anti-skid brake control system, to which the preferred embodiment of a vehicle speed representing value derivation system according to the invention, is applied.
Figure 1B:
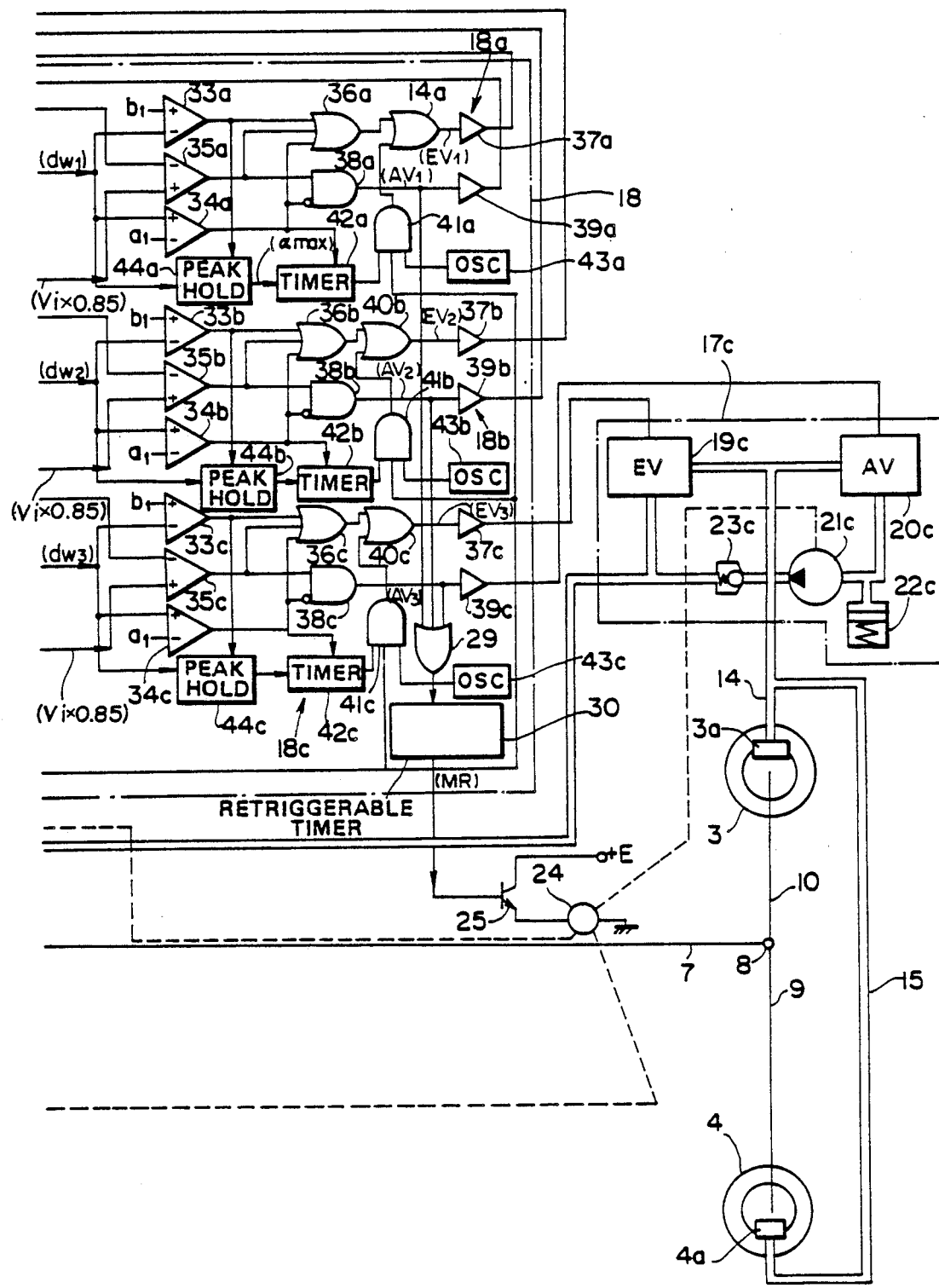

Referring now to the drawings, particularly to FIG. 1, the preferred embodiment of an anti-skid brake control system, according to the present invention, is designed for controlling braking pressure to be exerted on respective front and rear vehicular wheels 1, 2, 3 and 4. Each of the front and rear wheels 1, 2, 3 and 4 are co-operated with wheel cylinders 1a, 2a, 3a and 4a so that the latter may apply braking pressure to respectively associated front and rear wheels. On the other hand, the rear wheels 3 and 4 are connected to an automotive engine 5 through a power train constituted by a transmission 6, a propeller shaft 7, a differential gear unit 8 and drive shafts 9 and 10.

In the shown embodiment, the anti-skid brake control system controls braking force to be exerted to each wheel cylinders for performing anti-skid brake control and whereby preventing the wheels from skidding. Though it is neglected from the discussion given herebelow, the shown embodiment of the control system may also operate to control engine output torque or driving torque distribution to the driven rear wheels 3 and 4 so as to prevent the wheels from causing wheel-spin and to provide better tire/road traction. The engine output torque control or power distribution control may be performed by adjusting throttle valve angular position by means of a throttle valve servo systems, such as that disclosed in British Patent First Publications Nos. 2,154,763 and 2,154,765. The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474, filed on Sept. 4, 1986, assigned to the common assignee to the present invention. The disclosure of the above-identified co-pending U. S. Patent Application is also herein incorporated by reference for the sake of disclosure.

In the shown embodiment, a hydraulic brake system for applying braking fluid pressure to respective wheel cylinders 1a, 2a, 3a and 4a includes separated two hydraulic circuits 12, 13 and 14 which are, in turn, connected to a master cylinder 11 via pressure lines 11a and 11b. One of the hydraulic circuit 12 which is connected to the pressure line 11a, connects one of outlet ports of a master cylinder 11 to front-right wheel cylinder 1a which is associated with the front-right wheel 1. Similarly, the hydraulic circuit 12 which is also connected to the pressure line 11a, is connected to the front-left wheel cylinder 2a of the front-left wheel 2. The other outlet port of the master cylinder 11 is connected to the rear-right wheel cylinder 3a, and through a branch circuit 15, to the rear-left wheel cylinder 4a. As is well known, the master cylinder 11 is mechanically coupled with a brake pedal 16 for building-up braking fluid pressure depending upon magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a, 17b and 17c are disposed in the circuits 12, 13 and 14. As will be seen from FIGS. 1(A), 1(B) and 1(C), the anti-skid brake control valve assembly 17c is positioned upstream of the junction between the circuits 14 and 15. Therefore, braking fluid pressure to be exerted to the rear wheel cylinders 3a and 4a is commonly controlled by means of the anti-skid brake control valve assembly 17c. On the other hand, the anti-skid brake control valves 17a and 17b are respectively disposed in the circuits 12 and 13 at the positions downstream of the junction of the circuits 12 and 13 and the pressure line 11a. Therefore, the valves 17a and 17b controls braking fluid pressures at associated one of the wheel cylinders 1a and 2a, independently of each other.

The anti-skid brake control valve assemblies 17a, 17b and 17c have mutually identical constructions to each other. Therefore, it would not be necessary to give detailed description of the constructions for the valve assemblies 17a, 17b and 17c, respectively. In order to avoid redundant recitation and avoiding confusion in understanding the invention, the construction of the anti-skid brake control valve assembly 17a will only be described herebelow. The constructions of the valve assemblies 17b and 17c should be understood as identical to that of the valve assembly 17a set out below.

The anti-skid brake control valve assembly 17a includes an inlet (Ev) valve 19a, outlet (AV) valve 20a, a fluid pump 21a, accumulator 22a and one-way check valve 23a. The EV valve 19a has an inlet port connected to the associated outlet port of the master cylinder 11 via the hydraulic circuit 12 and an outlet port connected to the front-right wheel cylinder 1a. On the other hand, the Av valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The Ev valve 19a is controlled the valve position by an inlet control signal $EV_1$ from a control unit 18 between closed position and open position. Similarly, the Av valve 20a is controlled the valve position by an outlet control signal $AV_1$ from the control unit 18 between closed position and open position. Furthermore, the fluid pump 21a is connected to the control unit 18 to receive a pump drive signal MR to be controlled its operation between driving condition and resting condition.

In the preferred embodiment, the Ev valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ also becomes HIGH level to open the AV valve 20a. As a result, fluid communication between the wheel cylinder 1a and the accumulator 22a is established. At the same time, the pump drive signal MR turns into HIGH to drive the fluid pump 21a. Therefore, the fluid pressure in the accumulator 22a becomes lower than that in the wheel cylinder 1a. Therefore, the braking fluid in the wheel cylinder 1a is drawn into the pressure accumulator.

On the other hand, in the HOLD mode, the inlet control signal $EV_1$ is set HIGH level to close the Ev valve 19a and the outlet control signal $AV_1$ is set LOW level to maintain the AV valve 20a at closed position. Therefore, the wheel cylinder 1a is blocked fluid communication from the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|        | APPLICATION | RELEASE | HOLD |
|--------|-------------|---------|------|
| $EV_1$ | LOW         | HIGH    | HIGH |
| $AV_1$ | LOW         | LOW     | HIGH |
| MR     | —           | —       | HIGH |

As set forth the pressure control valve assemblies 17b and 17c are of identical constructions and operations as that set forth above with respect to the pressure control valve assembly 17a. For the sake of illustration, each components in the pressure control valve assemblies 17b and 17c are identified the same reference numerals with corresponding suffixes (b, c).

The control unit 18 is connected to a wheel speed sensors 26a, 26b and 26c for receiving pulse signal having frequency proportional to the rotation speed of the associated wheels 1, 2, 3 and 4. In practice, each of the wheel speed sensors 26a and 26b comprises a sensor rotor adapted to rotate with the vehicle wheel and a sensor assembly fixedly secured to the shim portion of the knuckle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with north pole head the sensor rotor and south pole distal from the sensor rotor. A metal element with a smaller diameter section is attached to the end of the magnetic core near the sensor rotor. The free end of the metal element faces the sensor teeth. An electromagnetic coil encircles the smaller diameter section of the metal element. The electromagnetic coil is adapted to detect variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

On the other hand, the wheel speed sensor 26c is associated with the propeller shaft 7 for producing a frequency signal having a frequency proportional to the rotation speed of the propeller shaft. The practical construction of the propeller shaft associated wheel speed sensor 26c is similar to that of the wheel speed sensors 26a and 26b. Therefore, detailed discussion about the construction of the wheel speed sensor 26c will not be given in view of simplification of the disclosure.

The control unit 18 has a controller circuit sections 18a, 18b and 18c for outputting inlet and outlet control signals. The controller circuit section 18a is designed to produce the inlet and outlet control signals $EV_1$ and $AV_1$ for the pressure control valve assembly 17a on the basis of the wheel speed indicative pulse signal from the wheel speed sensor 26a and representative of the rotation speed of the right-front wheel 1. Similarly, the controller circuit section 18b is designed to produce the inlet and outlet control signals $EV_2$ and $AV_2$ for the pressure control valve assembly 17b on the basis of the wheel speed indicative pulse signal output from the wheel speed sensor 26b and representative of the rotation speed of the left-front wheel 2. The controller circuit section 18c is designed to produce the inlet and outlet control signals $EV_3$ and $AV_3$ for the pressure control valve assembly 17c on the basis of the pulse signal from the wheel speed sensor 26c and representative of the rotation speed of the propeller shaft 7 which is, in other words, representative of an average rotation speed of the right-rear and left-rear wheels 3 and 4.

As the anti-skid brake control valves 17a, 17b and 17c, the controller circuit sections 18a, 18b and 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIG. 1, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and whereby derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ based on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052. Manners of derivation of the wheel speed $Vw_1$ and wheel acceleration $\alpha w_1$ have also been disclosed in:

U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,674,050, issued on June 16, 1987
U.S. Pat. No. 4,680,714, issued on July 12, 1987
U.S. Pat. No. 4,682,295, issued on July 21, 1887
U.S. Pat. No. 4,680,713, issued on July 14, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986

All sixteen prior published U.S. patents are issued to common applicant, i.e. Jun KUBO and commonly assigned to the common assignee to the present invention. The disclosures of the above-listed U. S. Patents are herein incorporated by reference for the sake of disclosure.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $\alpha w_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown) which generates an acceleration threshold indicative reference signal having a value indicative of a predetermined wheel acceleration threshold $+a$. The comparator 34a thus compares the wheel acceleration $\alpha w_1$ as indicated in the wheel acceleration indicative signal of the wheel acceleration derivation circuit 32a with the wheel acceleration threshold $+a$. The comparator 34a generally outputs a LOW level comparator signal while the wheel acceleration $\alpha w_1$ is held lower than the wheel acceleration threshold $+a$. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi which is derived by a projected vehicle speed representing data derivation circuit 46 and a desired optimum wheel slippage for optimizing vehicular braking efficiency. As is well known, the vehicular braking efficiency becomes maximum in a wheel slippage range of 10% to 20%. In the practical embodiment, the target wheel slippage $\lambda$ is set at 15%. On the other hand, the vehicle speed representing value Vi is derived on the basis of an instantaneous wheel speed Vw at the beginning of each cycle of anti-skid brake control. The procedure of derivation of the vehicular speed representing value Vi discussed later. The target wheel speed $V\lambda$ is derived at a value of 85% of the vehicle speed representing value Vi to indicate 15% of wheel slippage. The comparator 35a maintains a LOW level comparator signal while the wheel speed Vw is maintained higher than the target wheel speed $V\lambda$. On the other hand, the comparator signal level of the comparator 35a turns HIGH when the wheel speed Vw drops across the target wheel speed $V\lambda$.

The comparator signals of the comparators 33a and 34a and 35a are fed to input terminals of an OR gate 36a. The comparator 34a and 35a are also connected to an AND gate 38a to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to an oscillator 43a which is designed to a given constant frequency of pulse signal. The other input terminal of the AND gate 41a is connected to a retriggerable timer circuit 30 which is designed for producing a pump drive signal MR for driving the fluid pump 21a, 21b and 21c by applying the pump drive signal MR to pump drive motor 24 through a switching transistor 25.

The OR gate 36a and the AND gate 41a are connected to an OR gate 40a which serves to output the inlet control signal $EV_1$. The output terminal of the OR gate 40a is connected to the EV valve 19a of the anti-skid control valve assembly 17a via an amplifier 37a. On the other hand, the AND gate 38a serves to output the outlet control signal $AV_1$ to feed the outlet control signal to the AV valve 20a of the anti-skid control valve assembly 17a, via an amplifier 39a.

The projected vehicle speed representing data derivation circuit 46 is connected to the retriggerable timer circuit 30. The projected vehicle speed representing data derivation circuit 46 is designed to latch an instantaneous wheel speed Vw as an initial vehicle speed representing value $Vi_1$ in response to the leading edge of a HIGH level timer signal serving as the pump drive signal MR. The projected vehicle speed representing value derivation circuit 46 derives the vehicle speed representing value $Vi_1$ on the basis of the initial vehicle speed representing value corresponding to the latched wheel speed value $Vw_1$ as set forth above.

The projected vehicle speed representing data derivation circuit 46 is also connected to a select-HIGH switch 45 having three terminals respectively connected to the wheel speed derivation circuits 31a, 31b and 31c. The select-HIgh switch 45 selects the greatest value among three wheel speed representing values $Vw_1$, $Vw_2$ and $Vw_3$ from respective wheel speed derivation circuits 31a, 31b and 31c and outputs the selected value as a common wheel speed representing data Vw. The common wheel speed representing data Vw is transferred to the projected vehicle speed representing data derivation circuit 46. Therefore, the projected vehicle speed representing data derivation circuit 46 derives the projected vehicular speed representing data Vi on the basis of the common wheel speed representing data vw. The projected vehicular speed representing data Vi is further connected to a longitudinal acceleration sensor 47. The longitudinal acceleration sensor 47 is of generally known construction and monitors longitudinal acceleration exerted on the vehicular body to produce a longitudinal acceleration indicative sensor signal. In practice, the longitudinal acceleration sensor 47 produces a positive value longitudinal acceleration indicative sensor signal in response to the vehicular deceleration, value of which is variable depending upon the magnitude of deceleration, and a negative value longitudinal acceleration indicative sensor signal in response to the vehicular acceleration, value of which is variable depending upon magnitude of the vehicular acceleration. The projected vehicle speed representative data is delivered based on the common wheel speed representative data Vw and the longitudinal acceleration indicative sensor signal. The projected vehicle speed representative data Vi is fed to the target wheel speed derivation circuits 28a, 28b and 28c of respective controller circuit sections 18a, 18b and 18c.

Figure 2:
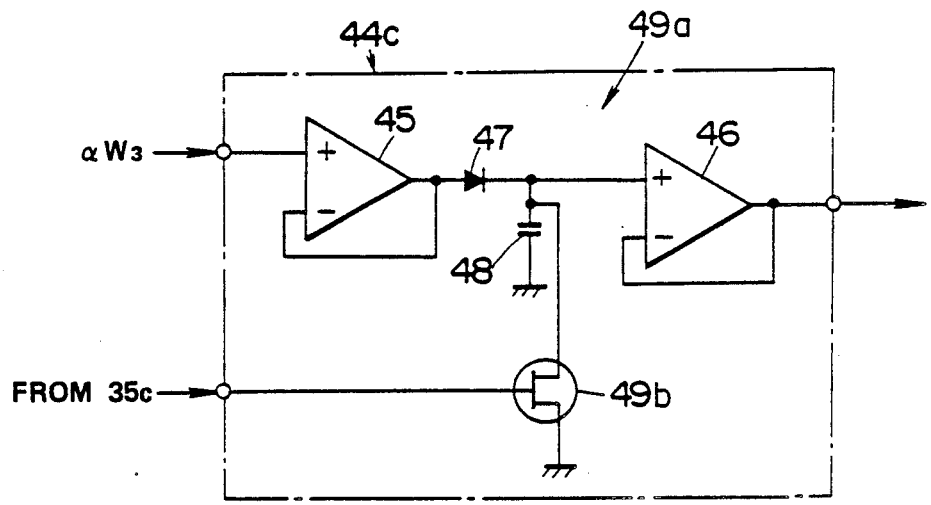
FIG. 2 is a circuit diagram of a peak detecting circuit in the wheel speed representing value derivation circuit of FIG. 1.

FIG. 2 shows detailed construction of the peak detector circuit 44a in the controller circuit section 18a set forth above. As will be seen from FIG. 2, the peak hold circuit 44a generally comprises a peak hold circuit 49a and an analog switch 49b. The peak hold circuit 48 is consisted of buffer amplifiers 45 and 46, a diode 47 and a capacitor 48. The buffer amplifier 45 of the peak hold circuit 49a is connected to the wheel acceleration derivation circuit 32a to receive therefrom the wheel acceleration indicative signal having a value representative of the wheel acceleration $aw_1$, at a non-inverted input terminal. An inverting input terminal of the buffer amplifier 45 is connected to an output terminal thereof for receiving the amplifier output as feedback input. The buffer amplifier outputs through its output terminal the amplifier output indicative of one of the inputs greater than the other. The amplifier output of the buffer amplifier 45 is fed to a charge/discharge circuit consisted of the diode 47 and the capacitor 48 and to a non-inverted input terminal of the other buffer amplifier 46. Similarly to the aforementioned buffer amplifier 45, an inverting input terminal of the buffer amplifier 46 is connected to an output terminal thereof to receive the amplifier output as feedback input.

Figure 3:
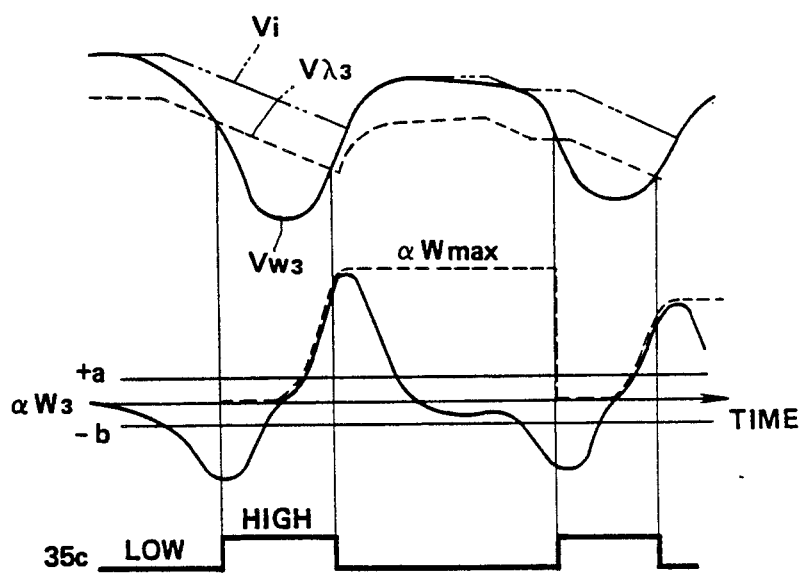
FIG. 3 is a chart showing manner of detection of the wheel speed peak to be carried out by the peak detecting circuit of FIG. 2.

The input side of the capacitor 48 is connected to the ground through the analog switch 49b. The analog switch 49b is connected to the comparator 33a. Therefore, the analog switch 49a becomes conductive at every leading edge of the HIGH level comparator signal from the comparator 33a for connecting the capacitor 48 to the ground. As a result, the potential in the capacitor 48 is discharged to the ground. Since the analog switch 49a is held conductive while the comparator signal from the comparator 33a is held at HIGH level, the potential in the capacitor 48 is maintained substantially zero during this period. The analog switch 49a becomes non-conductive in response to the trailing edge of the HIGH level comparator signal from the comparator 33a to block communication between the capacitor and the ground. As a result, the capacitor 48 start to be charged by the amplifier output from the buffer amplifier 45. The potential in the capacitor 48 is increased as increasing of the wheel acceleration $aw_1$ and held at the value corresponding to the peak value of the wheel acceleration, as shown in FIG. 3. Therefore, the amplifier output from the buffer amplifier 46 indicates peak value $aw_{max}$ of the wheel acceleration. As set forth above, since the potential in the capacitor 48 is discharged everytime the comparator signal rises to HIGH, the peak value $aw_{max}$ output from the peak detector circuit 44a represents the peak value of the wheel acceleration $aw_1$ in each skid cycle, while the anti-skid brake control is performed.

Figure 4:
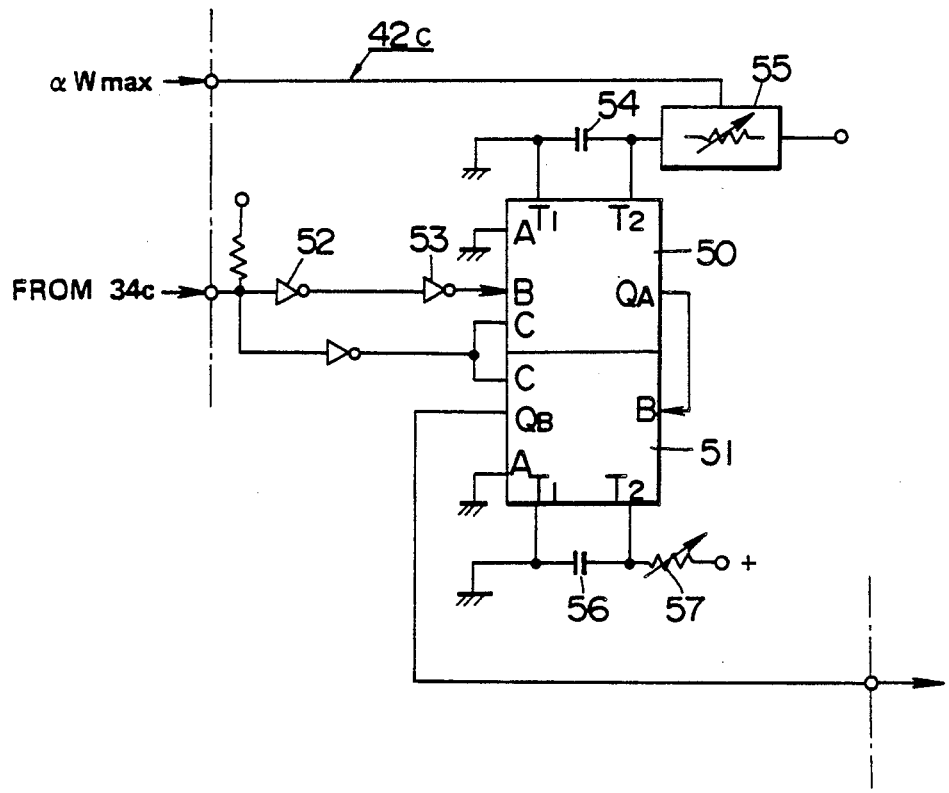
FIG. 4 is a circuit diagram of a variable timer circuit employed in the anti-skid brake control system of FIG. 1.

FIG. 4 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_4$ for a given period of time $T_1$. The period $T_1$ to maintain the timer signal $Q_4$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depending upon the peak value $\alpha w_{max}$ as indicated in the wheel acceleration peak indicative signal. Therefore, the timer period of the first timer 50 is variable in proportion to the magnitude of the peak value $\alpha w_{max}$.

Figure 5:
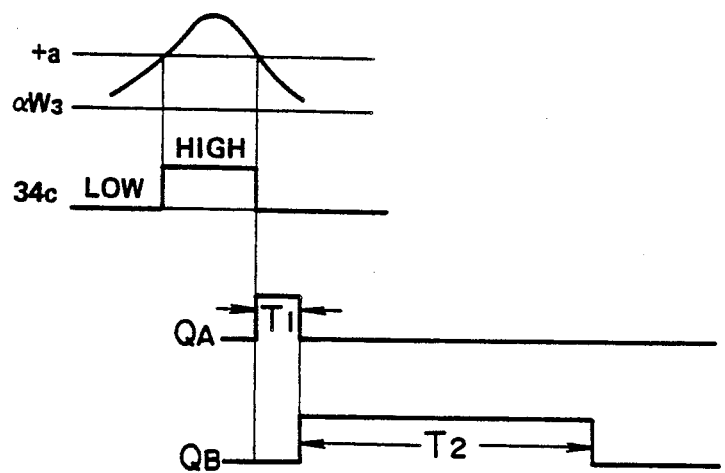
FIG. 5 is a chart showing operation of the variable timer circuit of FIG. 4.

The timer signal $Q_4$ of the first timer 50 is fed to a B input port of the second timer 51. The second timer 51 has a time constant circuit consisted of a capacitor 56 and a variable resistor 57 for providing a timer period $T_2$. The time constant of the time constant circuit of the capacitor 56 and the variable resistor 57 is set constant to set the timer period $T_2$ constant. Therefore, the second timer 51 is triggered by the trailing edge of the HIGH level input at the B input terminal. The second timer 51 as triggered outputs HIGH level timer signal for the timer period determined by the time constant of the time constant circuit of the capacitor 56 and the variable resistor 57, through $Q_B$ output terminal for the given period of time $T_2$, as shown in FIG. 5.

Figure 6:
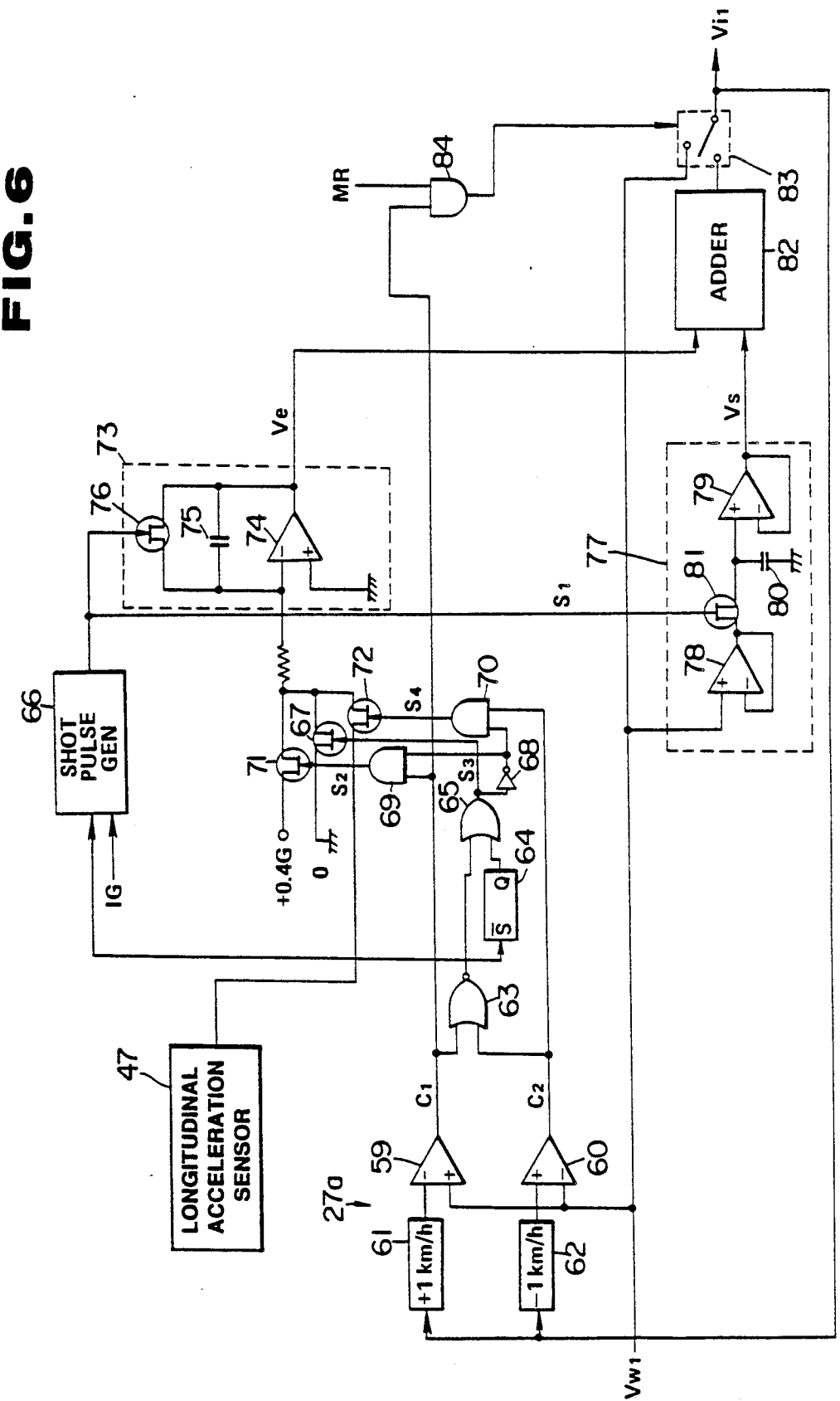
FIG. 6 is a block diagram of the preferred embodiment of the vehicle speed representing value derivation circuit in the anti-skid brake control system of FIG. 1.

FIG. 6 shows the detailed construction of the vehicle speed representing data derivation circuit 27a. As set forth above, the vehicle speed representing value derivation circuit 27a derives a vehicle speed representing value $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing value derivation circuit 27a through a subtracter 62. The adder 61 is designed to add a given value corresponding to 1 km/h of vehicle speed to the vehicle speed representing value $Vi_1$ for providing dead band of +1 km/h. The value as the sum of the vehicle speed representing value $Vi_1$ and the dead band value 1 km/h will be hereafter referred to as higher vehicle speed reference value. Similarly, the subtracter 62 subtracts a given value corresponding to 1 km/h of the vehicle speed from the vehicle speed representing value $Vi_1$ for providing dead band of −1 km/h. The value as the difference of the vehicle speed representing value $Vi_1$ and the dead band value −1 km/h will be hereafter referred to as lower vehicle speed reference value. The comparator 59 outputs HIGH level comparator signal when the wheel speed $Vw_1$ is higher than or equal to the higher vehicle speed reference value ($Vi_1 + 1$ km/h). In other words, the comparator signal level of the comparator 59 is held LOW as long as the wheel speed $Vw_1$ is maintained lower than the lower vehicle speed reference value ($Vi_1 + 1$ km/h). The comparator 60 outputs HIGH level comparator signal when the wheel speed $Vw_1$ is lower than to the lower vehicle speed reference value ($Vi_1 - 1$ km/h). In other words, the comparator signal level of the comparator 59 is held LOW as long as the wheel speed $Vw_1$ is maintained higher than or equal to the lower vehicle speed reference value ($Vi_1 - 1$ km/h).

The output terminals of the comparators 59 and 60 are connected to input terminals of NOR gate 63 to feed the comparator signals $c_1$ and $c_2$ thereto. The NOR gate 63 outputs HIGH level gate signal while signal levels of both of the comparator signals $c_1$ and $c_2$ are maintained LOW. Namely, the gate signal output from the NOR gate 63 is held LOW while the wheel speed $Vw_1$ is maintained higher than or equal to the vehicle speed representing value $Vi_1 - 1$ km/h and lower than the higher vehicle speed reference value ($Vi_1 + 1$ km/h). The gate signal of the NOR gate 63 is fed to a timer 64, an OR gate 65 and a shot-pulse generator 66, respectively. The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4G, to the integrator circuit 73.

The analog switch 72 is connected to a longitudinal acceleration dependent deceleration gradient generator circuit 100. The longitudinal acceleration dependent deceleration gradient generator circuit 100 is connected to the aforementioned longitudinal acceleration sensor 47 and comprises an absolute value circuit 91, an adder circuit 93, an offset value generator circuit 92 and an inverter circuit 90. The absolute value circuit 91 is directly connected to the longitudinal acceleration sensor 47 for receiving therefrom the longitudinal acceleration indicative sensor signal. As set forth, the longitudinal acceleration indicative sensor signal has a positive value when the longitudinal acceleration exerted on the vehicle body is backward acceleration causing vehicular deceleration and a negative value when the longitudinal acceleration exerted on the vehicle body is forward acceleration causing acceleration of the vehicle. Magnitude of the longitudinal acceleration indicative sensor signal is variable depending upon acceleration and deceleration acting on the vehicle body. Therefore, the absolute value output from the absolute value circuit 91 represents magnitude of longitudinal acceleration regardless the direction thereof. The output of the absolute value circuit 91 is fed to the adder circuit 93. The adder circuit 93 also receives an offset value indicative signal which represents offset value, e.g. 0.3G. The offset value of the offset value generator circuit 91 is so selected as not to cause significant influence in derivation of the projected vehicular speed representative data Vi. In the adder circuit 93, the offset value of the offset value generator circuit 91 is added to the absolute value output of the absolute value generator circuit 91. Therefore, the output of the adder circuit 93 is offset from the output of the absolute value circuit 91 in a magnitude corresponding to the offset value of the offset value generator circuit 92. The output of the adder circuit 93 is fed to the inverter circuit 90. The inverter circuit 90 inverts the received adder output to produce the deceleration gradient indicative data $-m$ on the basis of the received adder output.

The analog switch 72 will be likewise turned ON in response to the HIGH level selector signal $S_4$ to supply a voltage corresponding to possible minimum wheel acceleration value.

The integrator circuit 73 has a per se well known construction and is consisted of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 66 is responsive to an ON-set signal IG of an ignition switch to generate a first shot pulse as the first reset signal for resetting the integrator circuit 73. The shot-pulse generator 66 subsequently generate the shot-pulses serving as the reset signal $S_1$ at every edge of the HIGH level NOR gate signal. As set forth above, since the NOR gate signal becomes HIGH when the wheel speed $Vw_1$ satisfies $(Vi_1 - 1 \text{ km/h}) \leq Vw_1 < (Vi_1 + 1 \text{ km/h})$, the integrated value of the integrator 73 is reset every occurrence of the wheel speed $Vw_1$ in the aforementioned range. The reset signal $S_1$ of the shot-pulse generator 66 is also supplied to a sample hold circuit 77. The sample hold circuit 77 comprises a buffer amplifiers 78 and 79, a capacitor 80 and an analog switch 81. The analog switch 81 is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value $Vw_1$ at the occurrence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value $$Ve \left( = \int_0^t (-E) \cdot dt \right).$$

Therefore, the adder 82 adder the integrated value Ve to the sample value Vs to derive the vehicle speed representing value $Vi_1$. The output terminal of the adder 82 is connected to a switching circuit 83. The switching circuit 83 is also directly connected to the wheel speed derivation circuit 31a to be input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed $Vw_1$ is lower than the $Vi_1 + 1$ km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

Figure 7:
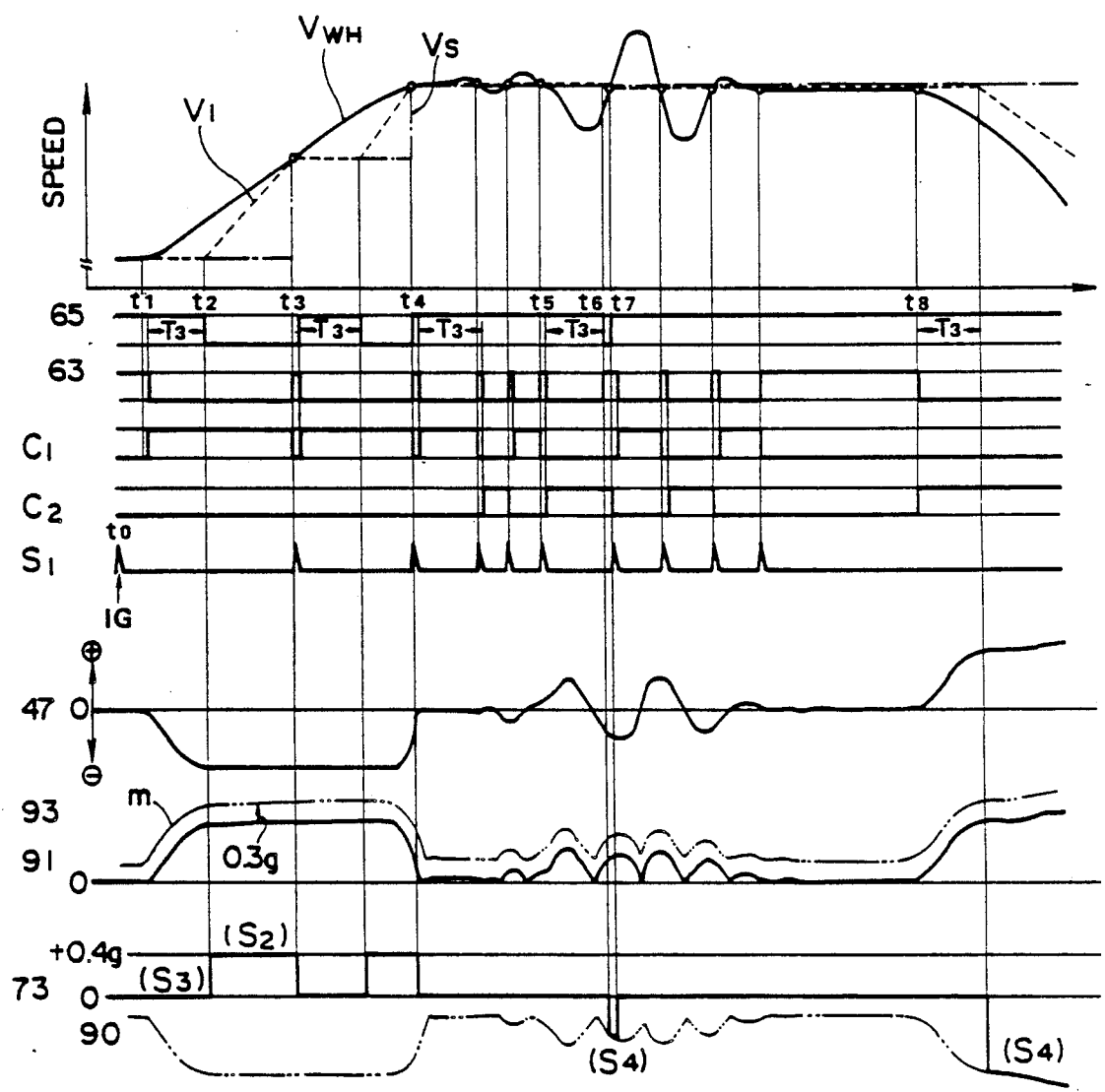
FIG. 7 is a timing chart showing operation of the vehicle speed representing value derivation circuit of FIG. 6.

Operation of the vehicle speed representing derivation circuit 27a will be described herebelow with reference to FIG. 7. In FIG. 7, the operation of the vehicle speed representing value derivation circuit 27a is described in a condition where the gate signal level of the AND gate 84 is maintained LOW level due to absence of the HIGH level pump signal MR or the comparator signal $c_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 7, the engine is started up at a time $t_0$. In response thereto, the On-set signal IG is input to the shot-pulse generator 66. Therefore, the shot pulse $s_1$ is output at the time $t_0$ from the shot-pulse generator 66. With the shot pulse at the time $t_0$, the sample hold circuit 77 is reset. The sample/hold circuit 77 as reset by the shot pulse $s_1$ at the time $t_0$, samples and holds the wheel speed signal value $Vw_1$ as sample value Vs. Therefore, after the time $t_0$, the held sample value Vs is output from the sample hold circuit 77 as an initial vehicle speed representing value. At the same time, i.e. at the time $t_0$, the integrator circuit 73 is reset by the reset signal $S_1$. Therefore, the value Ve of the integrator signal of the integrator circuit 73 drops to zero. As a result, the output value $Vi_1$ from the adder 82 becomes that equal to the held initial vehicle speed representing value vs, as shown by broken line in FIG. 7.

At this time, the comparator signals $c_1$ and $c_2$ of the comparators 59 and 60 are maintained LOW level. Therefore, the NOR gate signal of the NOR gate 63 is maintained HIGH level. Therefore, the gate signal level of the OR gate 65 is maintained HIGH level and the gate signal is fed to the analog switch 67 as the select signal $S_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals $S_2$ and $S_4$ of the AND gates 69 and 70 are held LOW to maintain the analog switches 71 and 72 at OFF position. Since the analog switch 67 serves to maintain the input level at the inverting input terminal of the comparator 74 in the integrator circuit 73 zero, the integrated value of the integrator circuit 73 is maintained zero. As a consequence, the output value of the adder 82 as the vehicle speed representing value Vi is maintained at the equal value to the initial vehicle speed representing value as the sample value Vs.

After the vehicle start running, the wheel speed Vw becomes greater than or equal to $Vi_1 + 1$ km/h, at a time $t_1$. In response to this, the comparator signal of the comparator 59 turns HIGH level. By the HIGH level comparator signal $c_1$ from the comparator 59, the gate signal of the NOR gate 63 turns LOW. At this time, since the timer 64 becomes active to output HIGH level timer signal for a period of time $T_3$, the gate signal level of the OR gate 65 is maintained HIGH level for the corresponding $T_3$ period. Therefore, the select signal $S_3$ is maintained HIGH level and the selector signals $S_2$ and $S_4$ are held at LOW level. Therefore, even after the vehicle start running the vehicle speed representing value $Vi_1$ is held at the equal value to the sample value vs for the $T_3$ period.

After expiration of the $T_3$ period, at a time $t_2$, the gate signal of the OR gate 65 turned into LOW level due to termination of the HIGH level timer signal from the timer 64. Since the comparator signal $c_1$ and the inverted gate signal from the OR gate 65 through the inverter 68 are both becomes HIGH level, the selector signal $S_2$ of the AND gate 69 turns HIGH. At the same time, because of LOW level gate signal of the OR gate 65 is applied to the gate of the analog switch 67 as the select signal $S_3$ to turn the latter OFF. At this time, since the comparator signal from the comparator 60 is maintained LOW level, the AND gate 70 is maintained non-conductive to feed the LOW level select signal $S_4$. Therefore, only analog switch 71 is turned ON to input a value E from an acceleration gradient indicative value generator circuit 85. As seen from FIG. 6, the acceleration gradient indicative value generator circuit 85 has an internal switch which selects 0.4G while anti-skid control is not active and selects 10G while anti-skid control is active. In order to select one of the aforementioned acceleration gradient indicative value, the acceleration gradient indicative value generator circuit 85 is connected to the retriggerable timer 30 receive therefrom the MR signal. Namely, when the MR signal is held LOW level which means that anti-skid control is not active, the internal switch of the acceleration gradient indicative value generator circuit 85 selects 0.4G.

On the other hand, when the MR signal is HIGH, the internal switch is switched to select 10G. By selecting greater acceleration gradient indicative value while the anti-skid control is active, increase rate of the projected vehicular speed representative data Vi becomes greater to provide quicker resumption of the vehicular speed. This may provide higher response in anti-skid control.

Assuming the anti-skid control is not active at the time $t_2$, the acceleration gradient indicative value corresponding to wheel acceleration magnitude of 0.4G is selected and fed to the integrator circuit 73 as the input voltage E. This value, e.g. 0.4G serves for defining gradient or inclination of the vehicle speed representing value $Vi_1$. The integrator circuit 73 thus receives the value (0.4G) through the analog switch 71 to output the integrator signal having a value Ve as set forth above. Therefore, the output value of the adder 82 increases from time-to-time as increasing of the integrator signal value Ve.

At a time $t_3$, the vehicle speed representing value $Vi_1$ $(=Vs+Ve)$ reaches a value to establish $Vw_1 < Vi_1 + 1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset. At the same time, the instantaneous wheel speed $Vw_1$ at the time $t_3$ is sampled and held in the sample hold circuit 77 as the renewed sample value Vs. By renewing the sample value Vs, the vehicle speed representing value $Vi_1$ becomes equal to the instantaneous wheel speed value $Vw_1$ and thus establishes $Vw_1 \geq Vi + 1$ km/h. Therefore, the comparator signal $c_1$ again turns ON at the time $t_3$. Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value Vs by the instantaneous wheel speed $Vi_1$ at the time $t_4$. After the time $t_4$, the sampled value Vs is maintained constant for the given period $T_3$ by the HIGH level timer signal of the timer 64. Before the HIGH level timer signal terminates, the shot pulse as the reset signal is generated by the shot pulse generator 66, as shown in FIG. 7. While the interval of the shot pulse of the shot pulse generator 66 is shorter than the timer period $T_3$, the integrated value of the integrator 73 is maintained zero. Therefore, the adder outputs the sampled value Vs as the vehicle speed representing value $Vi_1$.

After a time $t_5$, at which the reset signal $s_1$ is produced for resetting the sample hold circuit 77 and the integrator 73, the gate signal of the OR gate turns LOW at a time $t_6$ after expiration of the timer period $T_3$. During the period between the times $t_5$ and $t_6$, the wheel speed $Vw_1$ drops to be lower than $(Vi_1 - 1$ km/h$)$. Since the wheel speed $Vw_1$ is maintained lower than the value $(Vi_1 - 1$ km/h$)$ at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, the integrator 73 is connected to the inverter circuit 90 of the deceleration gradient indicative value generator circuit 100 to receive the deceleration gradient indicative value $-m$.

As seen from FIG. 7, the longitudinal acceleration indicative sensor signal value varies to have negative value while the vehicle is accelerating and positive value while the vehicle is decelerating. The longitudinal acceleration indicative sensor signal value is converted into positive value by the absolute value circuit 91 and output to the inverter circuit 90 with a given offset, e.g. 0.3G, via the adder circuit 93. Therefore, the output of the inverter circuit 90 reflects the input value m from the adder circuit 93, which includes longitudinal acceleration dependent component and offset component. Consequently, the integrated value Ve in the integrator 73 is decreased and becomes negative. The negative integrated value Ve is summed with the sample value Vs which corresponds to the instantaneous wheel speed $Vw_1$ at a time $t_5$ to gradually reduce the value of the vehicle speed representing value $Vi_1$. At a time $t_7$, the wheel speed $Vw_1$ is increased across the value $(Vi_1 + 1$ km/h). As a result, the reset signal $s_1$ is generated by the shot pulse generator 66. Then sample hold circuit 77 and the integrator 73 are thus reset.

At a time $t_8$, braking operation is initiated to abruptly decelerate the vehicle. As a result, the wheel speed $Vw_1$ drops across the value of $(Vi_1 - 1$ km/h). By this, the comparator signal $c_2$ of the comparator rises to HIGH level to destroy the NOR condition at the NOR gate 63. Therefore, the NOR gate signal of the NOR gate turns into LOW level. The timer 64 is thus triggered by the trailing edge of the HIGH level NOR gate signal to output HIGH level timer signal for the timer period $T_3$. After expiration of the timer period $T_3$, the value corresponding to the deceleration magnitude of $-1.2G$ is input to the integrator. Therefore, the vehicle speed representing value $Vi_1$ is gradually decreased.

Figure 8:
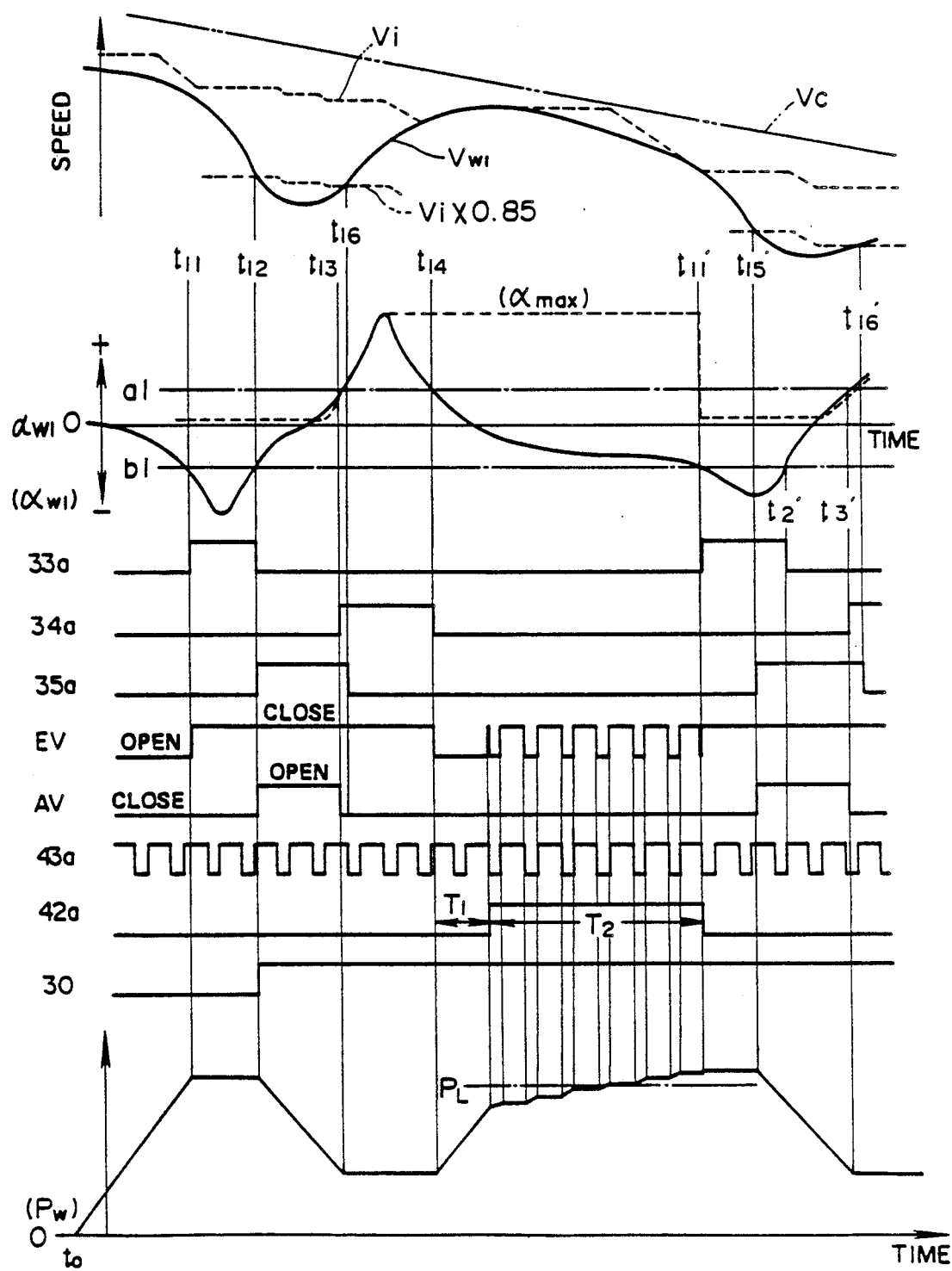
FIG. 8 is a timing chart showing operation of the anti-skid brake control to be performed by the anti-skid brake control system of FIG. 1 for controlling braking pressure for rear wheels.

FIG. 8 shows a timing chart of the operation of the controller circuit section 18a in anti-skid brake control for the rear wheels.

It is assumed that vehicular brake is applied for deceleration of the vehicle at a time $t_{10}$, hydraulic braking pressure is built up and distributed to all of the wheel cylinders 1a, 2a, 3a and 4a in common. According to increasing of the braking pressure in the wheel cylinder 1a, the right-front wheel 1 is decelerated.

At a time $t_{11}$, the wheel acceleration $\alpha w_1$ decreases across the wheel deceleration threshold $-b$. This results in initiation of anti-skid brake control. Namely, since the wheel acceleration $\alpha w_1$ becomes smaller than the wheel deceleration threshold $-b$, the comparator signal of the comparator 33a turns into HIGH level. This turns the gate signals of the OR gates 36a, 40a into HIGH level. Therefore, the inlet control signal $EV_1$ output through the amplifier 37a turns HIGH level. Therefore, both of the EV valve 19a is shut at the time $t_{11}$. At this time, since the output of the AND gate 38a is held LOW level, the outlet control signal $AV_1$ is held LOW. Therefore, the AV valve 20a is also maintained at closed position. Therefore, the anti-skid brake control valve assembly 17a is placed in HOLD mode position. The braking pressure in the right-front wheel cylinder 1a is thus held constant at the pressure level at the time $t_{11}$.

For the initial cycle of the anti-skid brake control, the vehicle speed representing value Vi is derived by the vehicle speed representing value derivation system 27. Based on the common vehicle speed representing value Vi, the target wheel speed $V\lambda_1$ is derived at a value 85% of Vi. As described above, since the vehicle speed representing value decreases according to the integrated value of the integrator 73, the target wheel speed $V\lambda_1$ decreases continuously. At a time $t_{12}$, the common wheel speed $Vw_1$ decelerated across the target wheel speed $V\lambda_1$. Then, the comparator signal of the comparator 35a turns into HIGH level. At this time, since the comparator signal of the comparator 34a is held LOW to apply HIGH level input to the AND gate 38a through the inverting input terminal, AND condition is established at the AND gate 38a. Therefore, the gate signal of the AND gate 38a turns into HIGH level to cause HIGH level outlet control signal $AV_1$. This operates the anti-skid brake control valve assembly 17a into the RELEASE mode position. Therefore, the braking pressure in the wheel cylinder 1a is released by feeding back the pressurized braking fluid to the pressure accumulator 22a. At the same time, by the HIGH level outlet control signal $AV_1$, the retriggerable timer 30 is triggered to start outputting of the pump drive signal MR. Therefore, the pump motor 24 is start driving to drive the fluid pump 21a.

By decreasing the braking pressure in the wheel cylinder 1a, the wheel speed $Vw_1$ are resumed and therefore wheel acceleration $\alpha w_1$ is increased. The wheel acceleration $\alpha w_1$ increases across the wheel deceleration threshold $-b$ at a time $t_{13}$. Therefore, the comparator signal of the comparator 33a turns into LOW level at the time $t_{13}$. However, at this time, since the HIGH level comparator signal is input to the OR gate 36 is maintained HIGH level. Therefore, the gate signal of the OR gate 40a is held HIGH to maintain the inlet control signal $Ev_1$ at HIGH level Therefore, the anti-skid control valve assembly 17a is maintained at the RELEASE mode, at the time $t_{13}$. Thus, the wheel speeds $Vw_1$ are continued to increase. Accordingly, the wheel acceleration $\alpha w_1$ increases. At a time $t_{14}$, the wheel acceleration $\alpha w_1$ increases across the wheel acceleration threshold $+a$. This results in HIGH level comparator signal of the comparator 34a. This HIGH level comparator signal of the comparator 34a turns the input level at the inverting input terminal of the AND gate 38a into LOW level. Therefore, the AND gate signal of the AND gate 38a turns into LOW level. Therefore, the outlet control signal $AV_1$ turns into LOW level to close the AV valve 20a in the anti-skid brake control valve assembly 17a. As a result, the anti-skid brake control valve assembly 17a is again placed into the HOLD mode to maintain the braking pressure level constant at the pressure level at the time $t_{14}$. By holding the braking pressure at decreased level, the wheel speed $Vw_1$ still increases. Also, according to increasing of the wheel speed, wheel acceleration $\alpha w_1$ increases toward the peak $\alpha w_{max}$. As seen from FIG. 8, the rear wheel speed $Vw_1$ increases across the target wheel speed $V\lambda_1$ at a time $t_{15}$. This results in LOW level comparator signal of the comparator 35a. After this, at a time $t_{16}$, the wheel acceleration $\alpha w_1$ drops across the wheel acceleration threshold $+a$. In response to drop of the wheel acceleration $\alpha w_1$ across the wheel acceleration threshold $+a$, the comparator signal of the comparator 34a turns into LOW level. Therefore, the all of the inputs to the OR gate 36a becomes LOW level. Therefore, the OR gate signal of the OR gate 36a turns into LOW level to cause LOW level inlet control signal $EV_1$ at the time $t_{16}$. At the same time, the variable timer 42a is activated by the trailing edge of the HIGH level comparator signal of the comparator 34a to output HIGH level timer signal for a period $T_2$ after a delay time $T_1$ which is variable depending upon the wheel acceleration peak value as latched by the peak hold circuit 44a. During the period T$_2$, the oscillator 43a is triggered to output constant pulse signals. As will be appreciated, while the pulse signal is maintained ON (HIGH) level, AND conditions are established in the AND gate 41a to maintain the inlet control signal EV$_1$ at HIGH level. Therefore, during the delay time T$_1$, the anti-skid brake control valve 17a is held in APPLICATION mode to increase the braking pressure. On the other hand, during the period T$_2$, the operation mode of the anti-skid brake control valve 17a are alternated between APPLICATION mode and HOLD mode repeatedly.

At a time t$_{17}$, the wheel acceleration αw$_1$ drops across the wheel deceleration threshold −b. Therefore, another cycle of anti-skid brake control is initiated. At the same time, the peak hold circuit 44a is reset by the leading edge of the HIGH level comparator signal of the comparator 33a. Thereafter, one skid cycle of anti-skid brake control operation is performed during the period t$_{17}$ to t$_{22}$.

As will be appreciated herefrom, the anti-skid brake control to be taken place for releasing the braking pressure in both of the rear wheel cylinders in response to decreasing of the common wheel speed Vw across the target wheel speed Vλ$_1$ in synchronism with each other and at the same rate. On the other hand, in the APPLICATION mode, the braking pressures in the wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value Vi$_1$ at the value precisely reflecting the vehicle speed to allow precise control for the brake.

Though the shown embodiment of the anti-skid brake control system, according to the present invention, employs the technique for deriving the projected vehicular speed representative data on the basis of a longitudinal acceleration, it may be possible to introduce the technique for other way of projection of the vehicular speed representative data.

Figure 9A:
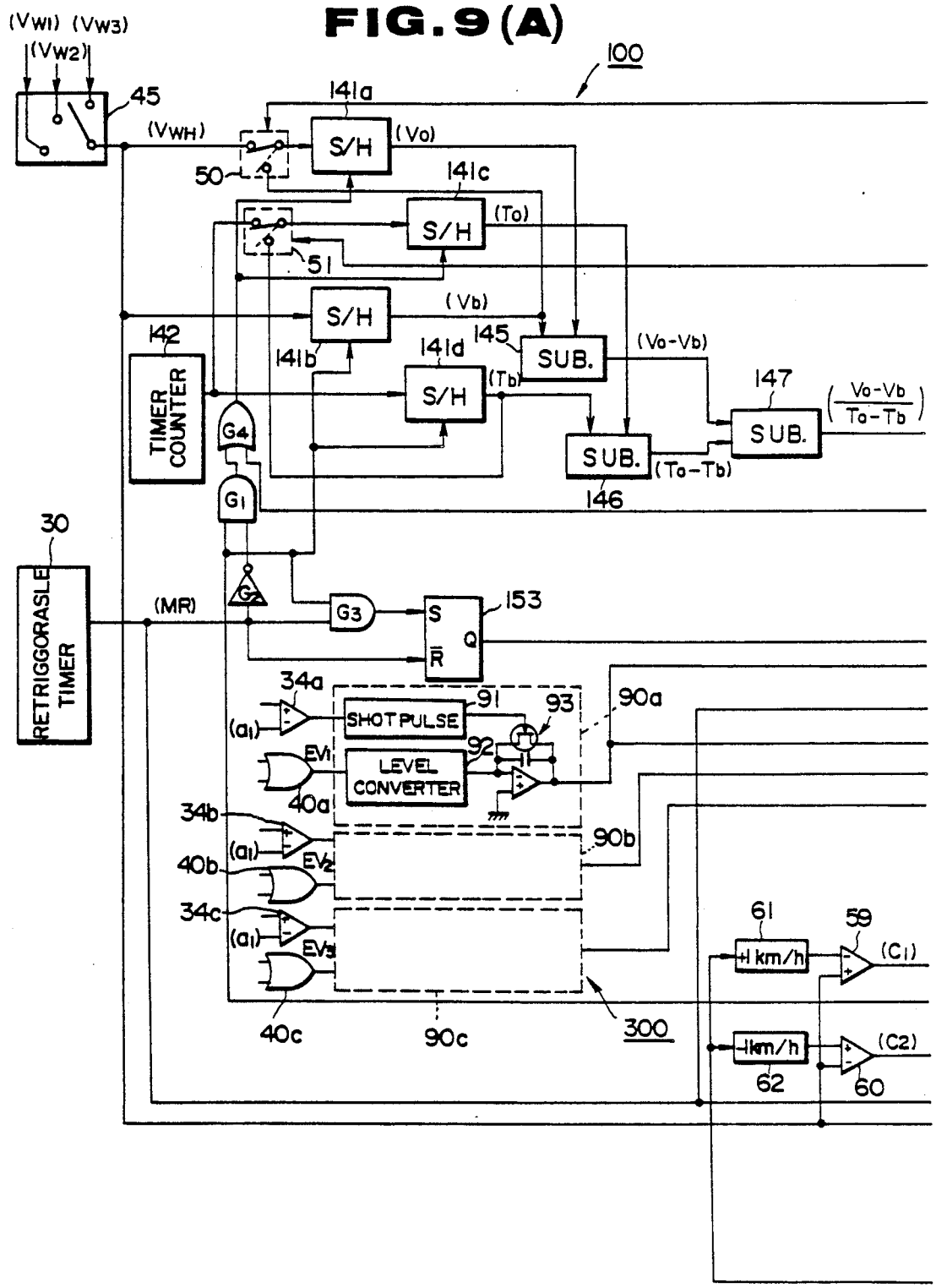
FIGS. 9(A) and 9(B) are block diagrams showing detail of another embodiment of a projected vehicular speed representing data (Vi) derivation circuit in the preferred embodiment of the anti-skid brake control system of FIG. 1.
Figure 9B:
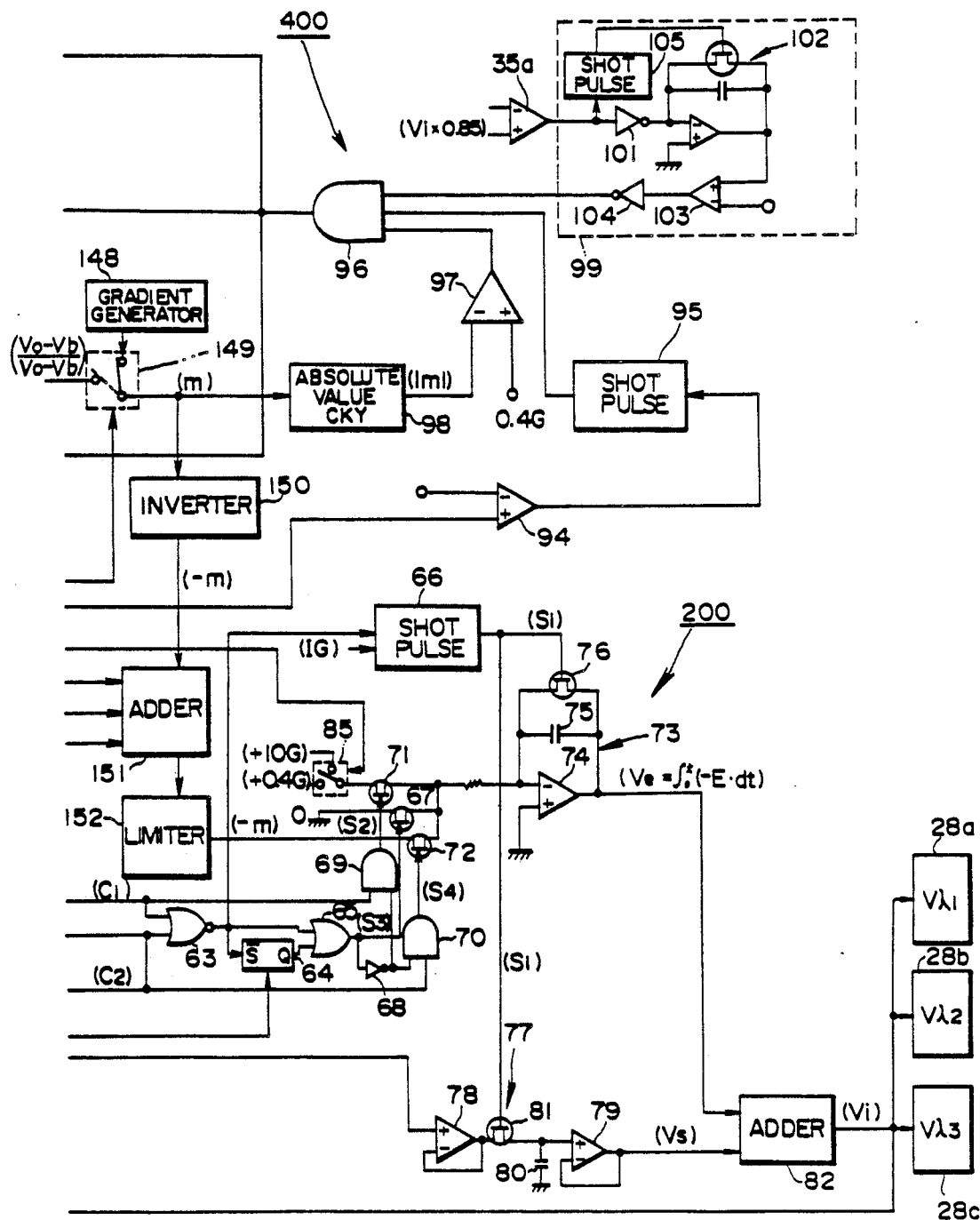

For example, FIG. 9 shows the detailed construction of another embodiment of the projected vehicular speed representing data derivation circuit 46 which employs the technique according to the invention. In FIG. 9, the circuit components common to the foregoing preferred embodiment will be represented by the reference numerals to that of the former embodiment. In this embodiment, the projected vehicular speed representing data derivation circuit 46 generally comprises a basic gradient derivation stage 100, a projected vehicular speed representing data derivation stage 200, a re-application detecting stage 300 and a basic gradient correcting stage 400.

The basic gradient derivation stage 100 includes sample/hold circuits 141a, 141b, 141c and 141d. The sample/hold circuit 141a is connected to the select-HIGH switch 45 via a switch 50. The switch 50 selectively connects the sample/hold circuit 141a to the select-HIGH switch 45 and to a subtrator 145 which will be discussed later. Similarly, the sample/hold circuit 141c is connected to the select-HIGH switch 45 via a switch 51. The switch 51 selectively connects the sample/hold circuit 141c to the timer counter 142 and to a subtrator 146 which will be discussed later. On the other hand, the sample/hold circuit 141b is directly connected to the select-HIGH switch 45 to constantly receive the common wheel speed representing data Vw. The sample/hold circuit 141d is connected to a timer counter 142 which is connected to a clock generator (not shown) to count up a periodic timing pulse from the clock generator and having a constant frequency, to output a timer signal. The sample/hold circuit 141d samples and holds the timer signal value of the timer counter 142.

The sample/hold circuits 141a and 141c are connected to an OR gate G4 which has one input terminal connected to an AND gate G1 and the other input terminal connected to an AND gate 96 in the basic gradient correcting stage 400 which will be discussed later. One input terminal of the AND gate G1 is connected to a comparator 60 which will be discussed later, in the projected vehicular speed derivation stage 200 in order to receive a C2 signal therefrom. The other input terminal of the AND gate G1 is connected to the retrigerable timer 30 via an inverter G2 in order to receive inverted MR signal. Therefore, the output of the OR gate G4 serves as sample/hold control command for the sample/hold circuits 141a and 141c. On the other hand, the sample/hold circuits 141b and 141d are directly connected to the comparator 60 to receive the C2 signal therefrom as the sample/hold control command.

With the arrangement set forth above, the sample/hold circuit 141a is responsive to the HIGH level output of the OR gate G4 to hold the common wheel speed representing data Vw. On the other hand, the sample/hold circuit 141b operates in synchronism with the C2 signal to hold the common wheel speed representing data Vw. Similarly, the sample/hold circuit 141c is responsive to the HIGH level output of the OR gate G4 to hold the common wheel speed representing data Vw. On the other hand, the sample/hold circuit 141d operates in synchronism with the C2 signal to hold the timer signal value.

The sampled common wheel speed representing data V0 in the sample/hold circuit 141a, which data will be hereafter referred to as "V0 data", and the sampled common wheel speed representing data Vb of the sample/hold circuit 141b which data will be hereafter referred to as "Vb data", are fed to the subtracter 145 when the switches 50 and 51 are both switched to connect the sample/hold circuits to the subtracter as controlled by the output of the AND gate 96. On the other hand, the sampled timer value T0 of the sample/hold circuit 141c which timer value will be hereafter referred to as "T0 timer value", and the sampled timer value Tb of the sample/hold circuit 141d which will be hereafter referred to as "Tb timer value", are fed to the subtracter 146.

The subtracter 145 derives a wheel speed difference data ΔV (=V0−Vb) based on the input V0 data and Vb data. On the other hand, the subtracter 146 derives a time difference data ΔT (=T0−Tb) on the basis of the input T0 timer value and the Tb timer value. The wheel speed difference data ΔV of the subtracter 145 and the time difference data ΔT of the subtracter 146 are fed to a divider 147. The divider 147 divides the wheel speed difference data ΔV by the time difference data ΔT to derive a basic gradient value m.

The divider 147 is connected to an absolute value circuit 98 of the basic gradient correction stage 400 and to an inverting circuit 150 via a switching circuit 149. To the switching circuit 149, a gradient signal generator circuit 148 which is designed to produce a fixed gradient indicative signal for the first skid cycle. In the preferred embodiment, the gradient signal generator circuit 148 produces the fixed gradient indicative signal representing preset vehicular deceleration magnitude, e.g. 0.4G. The switching circuit 149 is connected to a flip-flop circuit 153 to receive the output there from as a switching command. The flip-flop 153 has a set input terminal connected to an AND gate G3 which has one input terminal connected to the comparator 60 and the other input terminal connected to the retriggerable timer 30. With this arrangement, the flip-flop is set in response to the leading edge of the HIGH level signal of the AND gate G3. The flip-flop 153 also has a reset input terminal connected to the retriggerable timer 30 to be reset in response to the trailing edge of the MR signal. The flip-flop 153 outputs HIGH level output while it is held at set position and LOW level output while it is held at reset position. Therefore, at the first skid cycle, the switching circuit 149 is maintained in a position illustrated by the solid line in FIG. 9 to connect the gradient signal generator circuit 148 to the absolute value circuit 98 and the inverting circuit 150. On the other hand, in the subsequent skid cycles, the switching circuit 149 is switched at the switch position as illustrated by the broken line to connect the divider circuit 147 to the absolute value circuit 98 and the inverting circuit 150.

The inverter circuit 150 performs inversion for the basic gradient indicative signal output through the switching circuit 149 to "−m". The inverted basic gradient indicative signal −m is input to an adder circuit 151 which will be discussed later.

The projected vehicular speed derivation stage 200 includes a comparator 59 which has a non-inverting input terminal connected to the select-HIGH switch 45 to receive therefrom the common wheel speed representing data Vw. The comparator 59 also has an inverting input terminal connected to an upper deadband reference signal generator circuit 61 to receive therefrom an upper deadband reference signal Vi+ which has a value greater than the projected vehicular speed representing data Vi by −1 km/h. The comparator 59 thus outputs HIGH level comparator signal C1 when the common wheel speed representing data Vw is greater than or equal to the upper deadband reference signal value Vi+ and LOW level comparator signal when the common wheel speed representing data is smaller than the upper deadband reference signal value. As set forth, the projected vehicular speed derivation circuit 200 also has the comparator 60 which has an inverting input terminal connected to the select-HIGH switch 45 and a non-inverting input terminal connected to a lower deadband reference signal generator circuit 62. The lower deadband reference signal generator circuit 62 produces a lower deadband reference signal Vi− which represents a value smaller than the projected vehicular speed representing data Vi by 1 km/h. The comparator 60 thus output HIGH level comparator signal C2 when the common wheel speed representing data Vw is smaller than the lower deadband reference signal value Vi− and LOW level common wheel speed representing data Vw is greater than or equal to the lower deadband reference signal value Vi−. The comparators 59 and 60 are connected to a NOR gate 63. The NOR gate 63 thus output HIGH level gate signal only when both of the inputs from the comparators 59 and 60 are LOW level. Namely, when the common wheel speed representing data Vw is held smaller than the upper deadband reference signal value Vi+ and is greater than or equal to the lower deadband reference signal value Vi−, the gate signal of the NOR gate 63 becomes HIGH. The inverting output terminal of the NOR gate 63 is directly connected to one input terminal of an OR gate 65 and connected to the other input terminal of the OR gate 65 via a timer 64. The timer 64 is responsive to trailing edge of the HIGH level gate signal of the NOR gate 63 to output HIGH level signal for a period which is variable depending upon presence and absence of the MR signal of the retriggerable timer 30. In the preferred embodiment, the timer 64 output HIGH level signal for about 0.1 sec. while the MR signal is absent and for about 5 sec. while the MR signal present. Therefore, the gate output of the OR gate 65 is maintained HIGH level for the period while the output of the timer 64 is held HIGH level, after changing the signal level of the gate signal of the NOR gate 63 from HIGH to LOW level.

Preferably, the timer 64 is provided capability of varying the preset period in which the HIGH level timer signal is generated. For example, the set $T_3$ period of the timer 64 may be shortened while the MR signal of the retriggerable timer 30 is maintained HIGH level, than that is used while the MR signal is held LOW. This will further improve responsibility in variation of the vehicular speed representative data.

The OR gate 65 is directly connected to an analog switch 67 and to one input terminal of an AND gate 70 via an inverter 68. The output terminal of the AND gate 70 is connected to an analog switch 72. The other input terminal of the AND gate 70 is connected to the output terminal of the comparator 60. The output of the OR gate 65 is also fed to one input terminal of an AND gate 69 via the inverter 68, which AND gate has an output terminal connected to an analog switch 71. The other input terminal of the AND gate 69 is connected to the output terminal of the comparator 59.

In the practical embodiment, the analog switches 67, 70 and 71 comprises MOS transistor having gate electrode connected to the OR gate 65, the AND gate 70 and the AND gate 69 respectively. The AND gates 69 and 70 outputs gate signals $S_4$ and $S_2$ for switching the associated analog switches 71 and 72 between ON and OFF. Similarly, the gate signal $S_3$ of the OR gate 65 serves as switching signal for the analog switch 67. The analog switch 71 as turned ON, connects an acceleration reference generator 85 to the inverting input terminal of an operational amplifier 74 in an integrator circuit 73. The acceleration reference generator 85 includes an internal switch for selectively outputting mutually different two acceleration reference signal. In the shown embodiment, one of the acceleration reference signal is set at a value corresponding to vehicular acceleration of 0.4G and the other of the acceleration reference signal is set at a value corresponding to vehicular acceleration of 10G. These two acceleration reference represents possible maximum vehicular acceleration. The internal switch of the acceleration reference generator 85 is connected to the retriggerable timer 30 so that it selects 0.4G as the acceleration reference signal when the MR signal of the retriggerable timer 30 is held LOW and selects 10G as the acceleration reference signal when the MR signal is absent. Therefore, when anti-skid brake control is not active, the acceleration reference signal is set at a value corresponding to the vehicular acceleration of 0.4G and is set at the value corresponding to the vehicular acceleration 10G during anti-skid control being active.

On the other hand, the analog switch 67 as turned ON, connects the inverting input terminal of the operational amplifier 74 of the integrator circuit 73 to the ground. Therefore, when the analog switch 67 is held ON, the input level at the inverting input terminal of the operational amplifier 74 becomes zero (0) level. When the analog switch 72 is turned ON, the inverting input terminal of the operational amplifier 74 is connected to a deceleration reference signal generator circuit 152. The deceleration reference signal generator circuit 152 generates deceleration reference signal according to an input from a modified gradient generator circuit 151. The deceleration reference signal generator circuit 152 limits the value of the deceleration reference signal within a predetermined range defined by an upper limit value e.g. $-0.1G$ and a lower limit value, e.g. $-1.2G$.

The integrator circuit 73 comprises a capacitor 75 and an analog switch 76 in addition to the operational amplifier 74. The circuit construction and operation of the integrator per se are well known to those skilled in the art and is adapted to integrate the input voltage input through the analog switches 67, 71 and 72. The integrator circuit 73 outputs an integrator signal having a value indicative of the integrated value $$\left( = \int_0^t (-E) \times dt \right).$$

The analog switch 76 comprises MOS transistor having a gate electrode connected to an one-shot pulse generator circuit 66. The one-shot pulse generator circuit 66 is connected to an ignition switch (not shown) and to the inverting output terminal of the NOR gate 63. Therefore, the one-shot pulse generator circuit 66 is triggered by the leading edge of the HIGH level ignition signal which is maintained HIGH level while the ignition switch is held ON and by the leading edge of the HIGH level output of the NOR gate 63. The one-shot pulse $S_1$ of the one-shot pulse generator circuit 66 serves as reset signal for the integrator circuit 73 to clear the integrated value.

The one-shot pulse generator circuit 66 is further connected to an analog switch 81 in a sample/hold circuit 77. The sample/hold circuit 77 comprises buffer amplifiers 78 and 79, a capacitor 80 and the analog switch 81. As will be seen from FIG. 9, the sample/hold circuit 77 samples and holds the common wheel speed representative signal of the select-HIGH switch 45. The one-shot pulse $S_1$ of the one-shot pulse generator circuit 66 serves as reset signal for the sample/hold circuit 77 to clear the held value therein and updated by the instantaneous common wheel speed representative value.

The integrated value Ve of the integrator circuit 73 and the sampled value Vs of the sample/hold circuit 77 are input to an adder circuit 82. The adder circuit 82 adds the integrated value Ve to the sampled value Vs to derive the projected vehicular speed representative data Vi to be fed to the target wheel speed derivation circuits 28a, 28b and 28c.

The re-application detecting stage 300 comprises application counters 90a, 90b and 90c. Each application counters 90a, 90b and 90c is of identical construction to the others. Therefore, only the application counter 90a is illustrated in detail and will be given detailed discussion about circuit components and operations thereof.

The application counter 90a has a one-shot pulse generator circuit 91 and a level converter circuit 92. The one-shot pulse generator circuit 91 is connected to the output terminal of the comparator 34a and responsive to the trailing edge of the HIGH level comparator signal of the comparator 34a to generate one-shot pulse. On the other hand, the level converter circuit 92 is connected to an OR gate 40a to receive therefrom the inlet control signal $EV_1$. The level converter 92 adjusts the level of the inlet control signal $EV_1$ and feeds to an integrator circuit 93 which includes an operational amplifier, a capacitor and an analog switch. The integrator circuit 93 integrates the adjusted level of the inlet control signal Ev to output the integrated value indicative signal to the adder circuit 151 and to a comparator 94 in the basic gradient correcting stage 400. As will be appreciated, the integrated value of the integrator circuit 93 represents the magnitude of increasing of the braking pressure in the right-front wheel cylinder 1a in APPLICATION mode. The analog switch of the integrator circuit 93 is reset by the one-shot pulse of the one-shot pulse generator circuit 91.

Figure 10:
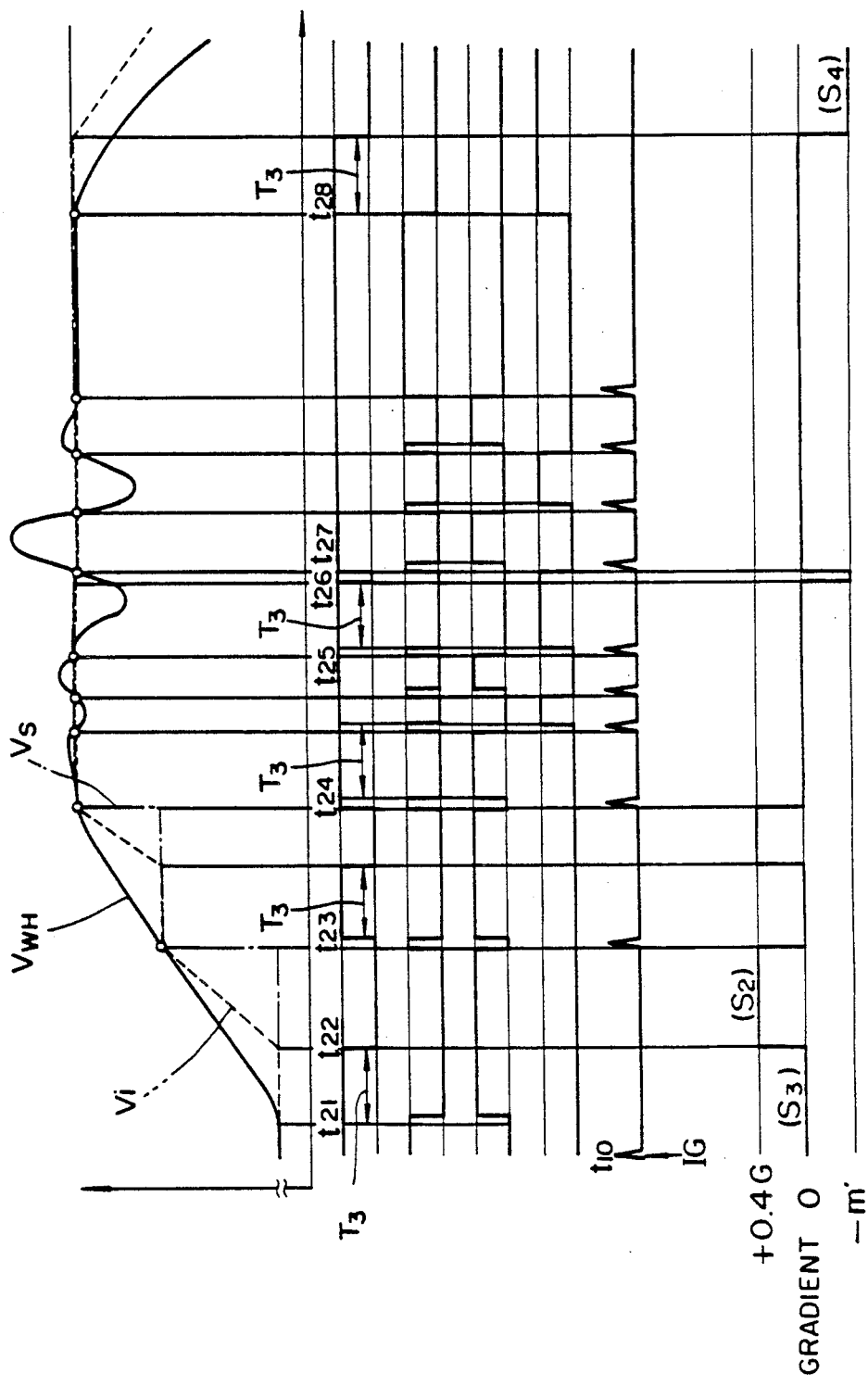
FIGS. 10 and 11 are timing charts respectively showing operation of the projected vehicular speed representing data derivation circuit of FIG. 9.

Though the application counter 90a which monitors re-application (re-entry into APPLICATION mode) in the right-front wheel 1, is connected to the comparator 94, it is possible to selected one of the application counters 90a, 90b and 90c to the comparator. Therefore, the specific circuit construction shown in FIG. 9 is to be regarded as mere example of implementation of the present invention. The application counter 90a detects the trailing edge of the inlet control signal $EV_1$ to count up the occurrence, as shown in FIG. 10. This count value of the application counter 90a serves as a value representative of magnitude of increase of the braking fluid pressure in the right-front wheel cylinder 1a. Similarly, respective application counters 90b and 90c counts up occurrence of termination of APPLICATION mode and whereby monitors increasing magnitude of the braking fluid pressure.

The comparator 94 of the basic gradient correcting stage 400 has non-inserting input terminal connected to the output of the integrator circuit 93 of the re-application detecting stage 300. The comparator 94 also has an inverting input terminal connected to a threshold generator (not shown) to receive therefrom a predetermined HIGH/LOW friction road criterion. Therefore, when the integrated value indicative signal of the integrator circuit 93 is greater than or equal to the HIGH/LOW friction road criterion, which represents higher friction than a criterion friction represented by the HIGH/LOW friction road criterion, the comparator 94 produces HIGH level comparator signal. The output terminal of the comparator 94 is connected to an one-shot pulse generator circuit 95 which is responsive to trailing edge of the HIGH level comparator signal of the comparator 94 to generate the one-shot pulse. The one-shot pulse thus produced by the one-shot pulse generator circuit 95 is fed to one of the input terminals of an AND gate 96. The AND gate 96 has three input terminals. Another input terminal of the AND gate 96 is connected a comparator 97 which compares the output of the absolute value circuit 98 representative of the absolute value $|m|$ of the basic gradient indicative data m with a preset value, e.g. 0.4G. The other input terminal of the AND gate 96 is connected to a NOT gate 104 of a lock period measuring circuit 99.

Figure 11:
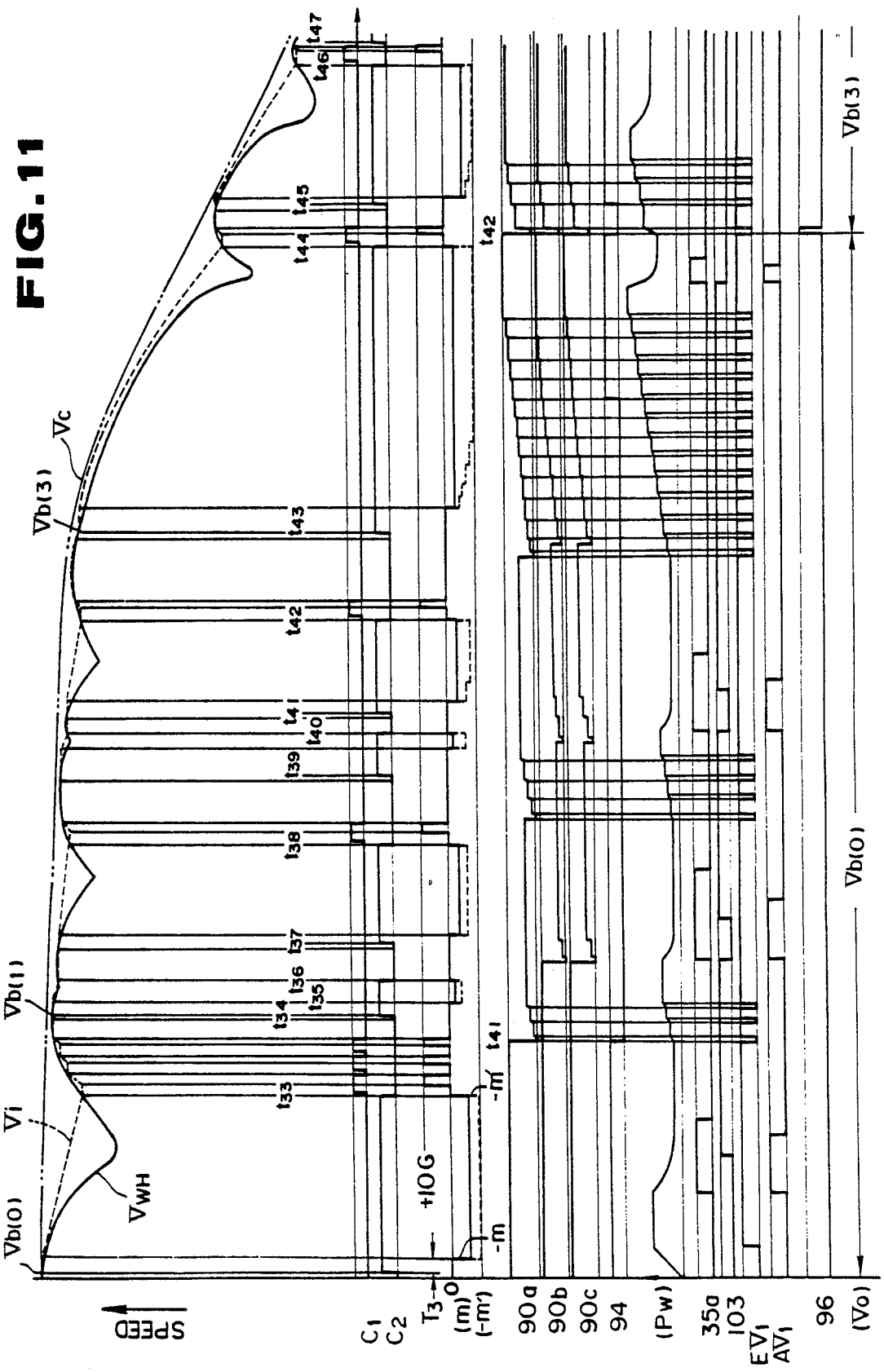

The lock period measuring circuit 99 comprises a one-shot pulse generator circuit 105, an inverter 101 and an integrator circuit 102. The one-shot pulse generator 105 is connected to the comparator 35a. The comparator 35a is also connected to the integrator circuit 102 via a NOT gate 101. The NOT gate 101 inverts the output of the comparator 35a to input to the integrator circuit 102. The one-shot pulse generator circuit 105 is triggered by the leading edge of the HIGH level comparator signal of the comparator 35a to output the one-shot pulse to reset the integrator 102. The integrator circuit 102 is connected to non-inverting input terminal of a comparator 103. As shown in FIG. 11, the integrator circuit 102 is reset by the shot pulse of the one-shot pulse generator circuit 105 and integrates the inverted input from the comparator 35a which is inputted via the inverter 101. The comparator 103 has an inverting input terminal to receive the HIGH/LOW friction road criterion to output HIGH level comparator signal as long as the integrated value from the integrator circuit 102 is greater than or equal to the HIGH/LOW friction road criterion. The output of the comparator 103 is fed via the NOT gate 104 at inverted form.

The AND gate 96 is responsive to satisfying of the AND condition of the three inputs set forth above to output HIGH level gate signal. The gate signal of the AND gate 96 is connected to the switches 50 and 51 and also to the OR gate G4. By the input to the sample/hold circuits 141a and 141c via the OR gate G4 from the AND gate 96, the sampled values $V_0$, $T_0$ to $V_b$ and $T_b$ which are sampled by the sample/hold circuits 141b and 141d. By this basic gradient to be derived by the basic gradient derivation stage 100 can be corrected.

The operation of the projected vehicular speed derivation circuit 46 will be discussed hereblow with reference to FIGS. 10 and 11.

At first the operation of the projected vehicular speed derivation stage 200 in the projected vehicular speed derivation circuit 46 will be discussed assuming that the common wheel speed representative data Vw varies as shown in FIG. 10. It is further assumed that the gradient ($-m$) is maintained constant.

At a time $t_{20}$, the ignition switch is turned into ON from OFF position. Therefore, the one-shot pulse generator circuit 66 is responsive to the leading edge of the HIGH level ignition signal IG to generate the shot pulse $S_1$ which serves as the reset pulse for the integrator circuit 73 and the sample/hold circuit 77. By this, the integrator circuit 73 is cleared the integrated value Ve to zero to restart integration of the voltage signals E input through the analog switches 71, 67 and 72. At the same time, the sample/hold circuit 77 is reset the sampled value and update the sampled value Vs with the instantaneous common wheel speed representative data Vw at the time $t_{20}$. The sampled value Vs is illustrated by one-dotted line in FIG. 10. At the time $t_{20}$, since the integrated value Ve is reset and thus is zero (0), the output value as the projected vehicular speed representative data Vi becomes equal to the sampled value Vs of the sample/hold circuit 77.

At this time $t_{20}$, since the sampled value Vs is equal to the common wheel speed representative data Vw, it becomes smaller than the upper deadband reference signal value Vi+ and greater than the lower deadband reference signal value Vi−. Therefore, both outputs C1 and C2 of the comparators 59 and 60 become LOW level. Therefore, the output of the NOR gate 63 becomes HIGH level. By the HIGH level gate signal of the NOR gate 63, the outlet level of the OR gate 65 is maintained HIGH. By this HIGH level gate signal $S_3$ of the OR gate 65, the analog switch 67 is turned ON to connect the inverting input terminal of the operational amplifier 74 of the integrator circuit 73 to the ground. At this time, because of the LOW level comparator signals of the comparators 59 and 60, the AND gates 69 and 70 are held non-conductive to maintain respectively associated analog switches 71 and 72 at non-conductive state. Because that the input voltage E is maintained zero, the integrated value of the integrator circuit 73 is maintained zero. Therefore, the projected vehicular speed representative data Vi is maintained at the sampled value Vs.

Assuming the common wheel speed representative data Vw becomes greater than or equal to the upper deadband reference signal value Vi+ at a time $t_{21}$, the output level of the comparator 59 turns into HIGH. By turning the comparator signal C1 into HIGH level, the output level of the NOR gate 63 becomes LOW. However, at this time, the timer 64 is set by the trailing edge of the HIGH level gate signal of the NOR gate 63 to input HIGH level signal to the OR gate 65 for the given period of time $T_3$. Therefore, during the period $T_3$, the output level of the OR gate 65 is maintained at HIGH level. By this HIGH level gate signal of the OR gate 65, the one input to the AND gate 69 is maintained at LOW level due to inversion of the OR gate signal performed by the inverter 68. Therefore, the AND gate 69 is maintained non-conductive despite HIGH level comparator signal of the comparator 59.

Upon expiration of the $T_3$ period, the OR gate signal of the OR gate 65 turns into LOW level at a time $t_{22}$. Then, the both input to the AND gate 69 becomes HIGH to make the gate conductive to turn the gate signal $S_2$ thereof into HIGH level. In response to the HIGH level gate signal $S_2$ of the AND gate 69, the analog switch 71 is turned ON to connect the acceleration reference signal generator 85 to the integrator circuit 73. As a result, the integrator circuit integrates the input voltage E therefrom. Assuming the retriggerable timer 30 is not activated to maintain the MR signal at LOW level, the internal switch of the acceleration reference signal generator circuit 85 selects 0.4G as the input signal voltage E. Therefore, the projected vehicular speed representative data Vi increases as increasing of the integrated value Ve in a rate corresponding to 0.4G. Therefore, the gradient of increasing of the projected vehicular speed representative data Vi becomes the value corresponding to 0.4G.

On the other hand, while the anti-skid brake control is performed and thus the MR signal is maintained at HIGH level, the acceleration reference signal generator circuit 85 selects the greater acceleration reference signal value, i.e. 10G, so that the projected vehicular speed representative data Vi can be increased at greater rate than that in the condition where anti-skid control is not performed, for quicker approach to the common wheel speed representative data Vw.

As will be appreciated, by inputting the input voltage E having value 0.4G or 10G from the acceleration reference signal generator circuit 85, the integrated value ve of the integrator circuit 73 increases. According to increasing of the integrated value Ve, the projected vehicular speed representative value Vi increases. Accordingly, the upper deadband reference signal value Vi+(Vi+1.0(km/h)) increases across the common wheel speed representative data Vw, at a time $t_{23}$. As a result, the comparator signal $C_1$ of the comparator 59 turns into LOW level to turn the gate signal of the NOR gate 63 into HIGH level. In response to the HIGH level gate signal of the NOR gate 63, the one-shot pulse generator circuit 66 produces the shot pulse to reset the sample/hold circuit 77 to hold the instantaneous common wheel speed representative data Vw as the sampled value Vs. At the same time, the integrated value Ve of the integrator circuit 73 is cleared. Similarly to the process set forth with respect to the period $t_{21}$ to $t_{23}$, the projected vehicular speed representative data Vi is maintained at a value corresponding to the sampled value Vs until the given period $T_3$ of the timer 64 expires. Therefore, the integrated value ve starts to increase to increase the projected vehicular speed representative data Vi toward the common wheel speed representative data Vw after expiration of the aforementioned $T_3$ period. By this, the upper deadband reference signal Vi+ reaches the common wheel speed representative data Vw at a time $t_{24}$.

During the period between the time $t_{24}$ to a time $t_{25}$, the common wheel speed representative data Vw fluctuates across the upper and lower deadband reference signal values Vi+ and Vi− at a frequency to have an interval shorter than the $T_3$ period as seen from FIG. 10. According to variation of the common wheel speed representative data Vw across the upper deadband reference signal value Vi+, the comparator signal of the comparator 59 turns between HIGH and LOW levels. However, even when the comparator signal of the comparator 59 drops to LOW level, the HIGH level signal is into to the NOR gate 63 from the timer 64. Therefore, the gate signal of the OR gate 65 is maintained at HIGH level throughout the period between the time $t_{24}$ to $t_{25}$. As a result, the analog switch 67 is maintained at ON position to maintain the integrated value Ve of the integrator circuit 73 zero.

At a time $t_{25}$, the common wheel speed representative data from the select-HIGH switch 45 decreases across the lower deadband reference signal value Vi−. In response to this, the comparator signal $C_2$ of the comparator 60 turns into HIGH level. By the HIGH level comparator signal $C_2$ of the comparator 60, the gate signal level of the NOR gate 63 turns LOW. Similarly to the above, the timer 64 is triggered by the trailing edge of the HIGH level gate signal of the NOR gate 63 to output HIGH level signal for the period $T_3$. Therefore, the gate signal of the OR gate 65 is maintained for the $T_3$ period in spite of the presence of HIGH level comparator signal of the comparator 60. At a time $t_{26}$, the $T_3$ period expires and the common wheel speed representative data Vw is held smaller than the lower deadband reference signal value Vi−, the gate signal of the OR gate 65 turns into LOW level to cause switching of the analog switch 67 from conductive state to non-conductive state. Simultaneously, the AND gate 70 becomes conductive to tern the analog switch 72 ON. As a result, the deceleration reference signal generator circuit 152 is connected to the integrator circuit 73 to input the deceleration reference signal −m′ which represents the deceleration gradient modified to maintain the value within the upper and lower limit values, to the latter as the input voltage E. Therefore, the integrated value Ve decreases at a rate corresponding to the gradient defined by the deceleration reference signal value −m′. Accordingly, the projected vehicular speed representative value Vi decreases at the corresponding rate.

At a time $t_{27}$, the common wheel speed representative data Vw increases across the lower deadband reference signal value Vi−. Therefore, the comparator signal $C_2$ of the comparator 60 turns into LOW level. By this, the NOR condition of the NOR gate 63 is established to cause HIGH level gate signal of the latter. The one-shot pulse generator circuit 66 is responsive to the leading edge of the HIGH level gate signal of the NOR gate 63 to generate the shot pulse. By this shot pulse, the integrator circuit 73 is reset to clear the integrated value ve. At the same time, the sample/hold circuit 77 is reset to update the sampled value vs with the instantaneous common wheel speed representative data Vw.

In the period between the time $t_{27}$ and $t_{28}$, though the common wheel speed representative data Vw fluctuates across the upper and lower deadband reference signal values Vi+ and Vi−. However, similarly to that in the period $t_{24}$ to $t_{25}$ set forth above, because of higher frequency than that defined by the $T_3$ period of the timer 64, the integrated value ve is maintained zero. After the time $t_{28}$, the common wheel speed representative data Vw decreases across the lower deadband reference signal value Vi−. Therefore, the similar operation to that discussed with respect to the period $t_{25}$ to $t_{27}$ is performed.

The operation of the overall circuit of the projected vehicular speed derivation circuit 46 during vehicular braking operation in which the anti-skid brake control is active, will be discussed herebelow with reference to FIG. 11. In the example of FIG. 11, it is assumed that the common wheel speed representative data Vw varies as shown.

As set forth, the application counter 90a counts up the occurrence of termination of the APPLICATION mode to monitor the increasing magnitude of the braking pressure Pw and is reset in response to trailing edge of the HIGH level comparator signal of the comparator 34a which represents the timing of re-application at times $t_{31}$ and $t_{32}$. This application counter 90a is not active at the initial skid cycle and is active in the second and subsequent skid cycles for counting up the occurrence of termination of APPLICATION mode in increasing of the fluid pressure in stepwise fashion.

When the counter value of the acceleration counter 90a is greater than the HIGH/LOW friction road criterion, the comparator signal of the comparator 94 becomes HIGH level. As set forth, the counter value of the application counter 90a is reset in response to the trailing edge of the HIGH level comparator signal of the comparator 34a, which turns from HIGH level to LOW level when the wheel acceleration $\alpha w_1$ decreases across the acceleration threshold a. The one-shot pulse generator circuit 95 produces the shot pulse in response to the trailing edge of the HIGH level comparator signal of the comparator 34a and input to the AND gate 95. On the other hand, the comparator 97 detects the output $|m|$ of the absolute value circuit 98 smaller than the HIGH/LOW friction road criterion to output HIGH level signal.

The lock period measuring circuit 99 is reset in response to the leading edge of the HIGH level comparator signal of the comparator 35a. The integrator circuit 102 in the lock period measuring circuit 99 is thus reset by the leading edge of the HIGH level comparator signal of the comparator 35a and integrates the elapsed time indicative value during the reset intervals. When the integrated value of the integrator circuit 102 is smaller than the HIGH/LOW friction road criterion, which represents that the road surface is in high-friction condition, the comparator signal of the comparator 103 becomes HIGH level and the gate signal of the NOT gate 104 becomes HIGH.

When the comparator signal level of the comparator 97 is HIGH and the gate signal of the NOT gate 104 is also HIGH, the AND gate 96 becomes conductive in response to the shot pulse of the one-shot pulse generator circuit 95 to output HIGH level gate signal in a form of a shot pulse corresponding to the shot pulse of the one-shot pulse generator circuit 95. Namely, the AND gate 96 outputs shot-pulse form HIGH level gate signal in synchronism with transition of the road surface condition from LOW friction road to HIGH friction road as illustrated as the operation of the AND gate 96 at the time $t_{32}$. In response to the shot-pulse form gate signal of the AND gate 96, the switches 50 and 51 are maintained at the switch positions illustrated by the solid lines in FIG. 9. Therefore, as long as the AND gate 96 is maintained in non-conductive state due to low friction of the road, the sample/hold circuits 141a and 141c are connected to the select-HIGH switch 45 and the timer counter 142. On the other hand, the switches 50 and 51 are switched into the switch positions as shown by the broken lines in FIG. 9 to connect the respective sample/hold circuits 141a and 141c to the sample/hold circuits 141b and 141d to update the sampled values $V_0$ and $T_0$ of the former with the sampled values $V_b$ and $T_b$ of the latter.

In the practical operation, assuming that the wheel acceleration $\alpha w_1$ does not become smaller than the deceleration threshold so as not to initiate anti-skid brake control operation and thus the MR signal of the retriggerable timer 30 is maintained LOW level, the common wheel speed representative data Vw decreases across the lower deadband reference signal value $V_i-$ by braking operation. When the comparator signal $C_2$ of the comparator 60 turns into HIGH level, the common wheel speed representative data Vw is sampled by the sample/hold circuits 141a and 141b as the sampled values $V_0$ and $V_b(0)$ in response to the leading edge of the comparator signal $C_2$ of the comparator 60. At the same time, the sample/hold circuits 141c and 141d samples the timer counter value as $T_0$ and $T_b(0)$.

At this time, because of the LOW level MR signal of the retriggerable timer 30, the flip-flop 153 is maintained at the reset position. Therefore, the output Q of the flip-flop 153 is maintained at LOW level. Therefore, the switching circuit 149 is maintained at the position illustrated by the solid line in FIG. 9 in order to connect the gradient signal generator circuit 148 to the absolute value circuit 98 and to the inverting circuit 150. Therefore, the preset initial gradient indicative signal representative of a preset gradient, e.g. 0.4G, is fed to the absolute value circuit 98 and to the inverting circuit 150, as the basic gradient data m.

At this condition, since the counter values of the application counters 90a, 90b and 90c are maintained at saturated values. These counter values are added to the basic gradient data m which corresponds to the initial gradient indicative signal value. As a result, the gradient indicative data $-m$ as represented by the modified gradient generator circuit 151 becomes out of the predetermined range as defined by the upper and lower limit values in the deceleration reference signal generator circuit 152. The output of the deceleration reference signal generator circuit 152 becomes a value corresponding to the lower limit value, e.g. $-1.2G$. Therefore, the projected vehicular speed representative data Vi is derived utilizing the derived deceleration reference signal value corresponding to the lower limit value.

It is further assumed that the anti-skid brake control is performed before the time $t_{33}$. At the time $t_{33}$, the common wheel speed representative data Vw increases across the lower deadband reference signal value $V_i-$. This causes the comparator signal $C_1$ of the comparator 59 turning into HIGH level. The comparator 60 is responsive to this to output the HIGH level comparator signal $C_2$ at a time $t_{34}$. The sample/hold circuit 141b is responsive to the leading edge of the HIGH level sample to update the sampled value with the instantaneous common wheel speed representative data Vw as the sampled value $V_b$. At the same time, the sample/hold circuit 141d samples the instantaneous timer value as the sampled value $T_b(1)$. These sampled values $V_b$ and $T_b$ of the sample/hold circuits 141b and 141d are subtracted from the samples values $V_0$ and $T_0$ of the sample/hold circuits 141a and 141c by the subtracter circuits 145 and 146. The subtracted wheel speed difference data $\Delta V_b(=V_b-V_0)$ derived by the subtracter 145 and the subtracted timer difference data $\Delta T_b(=T_b-T_0)$ derived by the subtracter circuit 146 are fed to the divider circuit 147. The divider 147 divides the wheel speed difference data $\Delta V_b$ by the timer difference data $\Delta T_0$ to derive the basic gradient data m.

At this time, since the anti-skid brake control is active and thus the retriggerable timer 30 is triggered to output the HIGH level MR signal, the flip-flop 153 is set to output the HIGH level signal Q to the switching circuit 149. Therefore, the divider circuit 147 is connected to the absolute value circuit 98 and the inverter circuit 150. By this, the resultant basic gradient data m derived by the divider circuit 147 is fed to the the absolute value circuit 98 and the inverter circuit 150. By the process set forth above, the gradient for deriving the projected vehicular speed representative data Vi for the period between a time $t_{35}$ and a time $t_{36}$. Similarly, the gradient for deriving the projected vehicular speed representative data Vi for the subsequent skid cycles respectively between times $t_{37}$ to $t_{38}$, $t_{39}$ to $t_{30}$, $t_{31}$ to $t_{32}$, and $t_{33}$ to $t_{34}$ are performed in the same manner as set forth above.

According to the shown embodiment, since the sampled values $V_0$ and $T_0$ of the sample/hold circuits 141a and 141c are updated with the instantaneous sampled values $V_b$ and $T_b$ upon the transition between the LOW friction road to HIGH friction road is detected by the basic gradient correcting stage 400, the anti-skid control can be performed with minimized influence of variation of the road friction.

Furthermore, according to the invention, since the basic gradient can be modified with a correction factor variable depending upon the magnitude of braking force to be exerted to the wheel, the precision in projecting the vehicular speed representing data can be improved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, various circuit components can be modified or replaced with the equivalent components. For example, the technologies of derivation of the projected vehicular speed representative data may be applicable for the anti-skid brake control systems disclosed in the following co-pending U.S. applications, all of which are commonly assigned to the assignee of the present invention:

U.S. patent application Ser. No. 945,565, filed on Dec. 23, 1986

U.S. patent application Ser. No. 945,559, filed on Dec. 23, 1986, corresponding German Patent Application has been published under First Publication No. 36 44 324

U.S. patent application Ser. No. 945,562, filed on Dec. 23, 1986, corresponding German Patent Application has been published under First Publication No. 36 44 325 and U.S. patent application Ser. No. 945,715, filed on Dec. 23, 1986, corresponding German Patent Application has been published under First Publication No. 36 44 221.

The disclosures of the above-identified co-pending U.S. Patent Applications and the German counterparts are herein incorporated by reference.

Furthermore, though the shown embodiment is concentrated to the anti-skid brake control system, the technologies of deriving the projected vehicular speed on the basis of the wheel speed, may be applicable for other control systems, such as slip control, traction control, driving torque control and so forth. For example, the derivation of the projected vehicular speed representative value in the present invention may also be applicable for the following co-pending U.S. Patent Applications, all of which have been assigned to the common assignee to the present invention:

U.S. patent application Ser. No. 918,125, filed on Oct. 14, 1986, corresponding German Patent Application has been published under First Publication No. 36 34 627

U.S. patent application Ser. No. 918,137, filed on Oct. 14, 1986

U.S. patent application Ser. No. 918,080, filed on Oct. 14, 1986 and

U.S. patent application Ser. No. 918,081, filed on Oct. 14, 1986.

The disclosures of the above-identified co-pending U.S. Patent Applications and the German counterparts are herein incorporated by reference.

What is claimed is:

1. A system for projecting vehicular speed representative data on the basis of a wheel speed for use in vehicular wheel slip control of a vehicular wheel including an anti-skid control and a traction control, comprising:

sensor means for monitoring rotation speed of said vehicular wheel to produce a wheel speed indicative sensor signal value representative of rotation speed of said vehicular wheel;

detector means for monitoring a vehicular acceleration representative parameter or a vehicular deceleration representative parameter and for deriving a gradient of vehicular speed based on said vehicular acceleration or deceleration representative parameter;

first means for latching a first wheel speed indicative value corresponding to said wheel speed indicative sensor signal value at a predetermined timing;

second means for deriving a time dependent vehicular speed variation datum by integrating said gradient of vehicular speed;

third means for deriving a projected vehicular speed representative datum based on said first wheel speed indicative value and said time dependent vehicular speed variation datum; and fourth means for detecting said wheel speed indicative sensor signal value in a predetermined relationship with said projected vehicular speed representative datum for generating a reset signal for resetting said time dependent vehicular speed variation datum.

2. A system for projecting vehicular speed representative data as set forth in claim 1, wherein said detector means monitors a longitudinal acceleration exerted on a vehicular body and produces a longitudinal acceleration indicative signal indicative of magnitude and direction of said longitudinal acceleration, said longitudinal acceleration indicative signal serves as said gradient of vehicular speed.

3. A system for projecting vehicular speed representative data as set forth in claim 1, wherein said fourth means detects said wheel speed indicative sensor signal value within a predetermined range defined about said projected vehicular speed representative datum.

4. A system for projecting vehicular speed representative data as set forth in claim 3, wherein said fourth means defines said predetermined range taking said projected vehicular speed representative datum as a center value.

5. A system for projecting vehicular speed representative data as set forth in claim 3, wherein said detector means monitors a longitudinal acceleration exerted on a vehicular body and produces a longitudinal acceleration indicative signal indicative of magnitude and direction of said longitudinal acceleration, said longitudinal acceleration indicative signal serves as said gradient of vehicular speed.

6. A system for projecting vehicular speed representative data as set forth in claim 3, wherein said detector means latches said first wheel speed indicative value corresponding to said wheel speed indicative sensor signal value at a predetermined timing in each skid cycle and periodically latches a second wheel speed indicative value corresponding to said wheel speed indicative sensor signal value, for deriving said gradient of vehicular speed on the basis of said first and second wheel speed indicative values and an interval of occurrences of latching of said first and second wheel speed indicative values.

7. An anti-skid brake control system for an automotive brake system comprising:

a hydraulic brake circuit comprising means for building up braking fluid pressure according to operational magnitude of a manually operable braking member and braking force generating means, associated with a vehicular wheel, for generating a braking force to decelerate said vehicular wheel;

.pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure;

sensor means for monitoring rotation speed of said vehicular wheel to produce a wheel speed indicative sensor signal value representative of said rotation speed of said vehicular wheel;

detector means for monitoring a vehicular acceleration representative parameter or a vehicular deceleration representative parameter for deriving a gradient of vehicular speed based on said vehicular acceleration or deceleration representative parameter;

first means for latching a first wheel speed indicative value corresponding to said wheel speed indicative sensor signal value at a predetermined timing;

second means for deriving a time dependent vehicular speed variation datum by integrating said gradient of vehicular speed;

third means for deriving a projected vehicular speed representative datum based on said first wheel speed indicative value and said time dependent vehicular speed variation datum; and fourth means for detecting said wheel speed indicative sensor signal value in a predetermined relationship with said projected vehicular speed representative datum for generating a reset signal for resetting said time dependent vehicular speed variation datum;

fifth means for controlling said pressure adjusting means between said first and second modes and for maintaining said rotation speed of said vehicular wheel in a predetermined optimal relationship with said projected vehicular speed representative datum.

8. An anti-skid brake control system as set forth in claim 7, wherein said second means derives said gradient of vehicular speed by adding to said vehicular deceleration representative parameter a given magnitude of offset value before deriving said time dependent vehicular speed variation datum.

9. An anti-skid brake control system as set forth in claim 8, wherein said fourth means detects said wheel speed indicative sensor signal value within a predetermined range defined about said projected vehicular speed representative datum.

10. An anti-skid brake control system as set forth in claim 9, wherein said fourth means defines said predetermined range by taking said projected vehicular speed representative datum as a center value.

11. An anti-skid brake control system for an automotive brake system of a vehicle comprising:

a hydraulic brake circuit comprising means for building up braking fluid pressure according to operational magnitude of a manually operable braking member, first braking force generating means, associated with a first vehicular wheel for generating braking force to decelerate said first vehicular wheel, and second braking force generating means, associated with a second vehicular wheel, for generating braking force to decelerate said second vehicular wheel;

first pressure adjusting means, disposed within said hydraulic circuit, for adjusting pressure of a working fluid to be delivered to said first braking force generating means, said first pressure adjusting means being operable at least in a first mode for increasing braking pressure in said first braking force generating means and in a second mode for decreasing braking pressure in said first breaking force generating means;

second pressure adjusting means, disposed within said hydraulic circuit, for adjusting pressure of a working fluid to be delivered to said second braking force generating means, said second pressure adjusting means being operable at least in a first mode for increasing braking pressure in said second braking force generating means and in a second mode for decreasing braking pressure in said second braking force generating means;

first sensor means for monitoring rotation speed of said first vehicular wheel to produce a first wheel speed indicative sensor signal value representative of said rotation speed of said first vehicular wheel;

second sensor means for monitoring rotation speed of said second vehicular wheel to produce a second wheel speed indicative sensor signal value representative of said rotation speed of said second vehicular wheel;

means for comparing said first and second wheel speed indicative sensor signal values and for selecting one having greater value as a common wheel speed indicative sensor signal value;

third sensor means for monitoring longitudinal acceleration exerted on a vehicular body for producing a longitudinal acceleration indicative sensor signal value;

gradient derivation means for deriving a gradient of vehicular speed based on said longitudinal acceleration indicative sensor signal value;

first means for latching a first wheel speed indicative value corresponding to said common wheel speed indicative sensor signal value at a predetermined timing;

second means for deriving a time dependent vehicular speed variation datum by integrating said gradient of vehicular speed;

third means for deriving a projected vehicular speed representative datum based on said first wheel speed indicative value and said time dependent vehicular speed variation datum; and fourth means for detecting said common wheel speed indicative sensor signal value in a predetermined relationship with said projected vehicular speed representative datum for generating a reset signal for resetting said time dependent vehicular speed variation datum; and fifth means for controlling said first and second pressure adjusting means operating between said first and second modes for maintaining said rotation speeds of said first and second vehicular wheels in a predetermined optimal relationship with said projected vehicular speed representative datum.

12. An anti-skid brake control system as set forth in claim 11, wherein said second means derives said gradient of vehicular speed by adding to said longitudinal acceleration indicative sensor signal value a given magnitude of offset value and time dependent vehicular speed variation datum.

13. An anti-skid brake control system as set forth in claim 11, wherein said fourth means detects said wheel speed indicative sensor signal value within a predetermined range defined about said projected vehicular speed representative datum.

14. An anti-skid brake control system as set forth in claim 13, wherein said fourth means defines said predetermined range by taking said projected vehicular speed representative datum as a center value.

15. An anti-skid brake control system as set forth in claim 14, wherein said fourth means comprises comparator means, said comparator means establishes a reference value with a first greater value component derived by adding a given value to said projected vehicular speed indicative datum, said first greater value component serves as an acceleration state criterion to determine that said vehicle is in an acceleration state when said wheel speed indicative sensor signal value is greater than said first greater value component, and a second smaller value component derived by subtracting said given value from said projected vehicular speed indicative datum, said second smaller value component serves as a deceleration state criterion to determine that said vehicle is in a deceleration state when said wheel speed indicative sensor signal value is smaller than said second smaller value component, so as to define a deadband around said projected vehicular speed indicative datum, said gradient indicative datum being maintained at zero in said deadband.

16. An anti-skid brake control system for an automotive brake system comprising:
    a hydraulic brake circuit comprising means for building up braking fluid pressure according to operational magnitude of a manually operable braking member, and means associated with a vehicular for generating a braking force to decelerate said vehicular wheel;
    pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure in said braking force generating means;
    sensor means for monitoring rotation speed of said vehicular wheel to produce a wheel speed indicative sensor signal value representative of said rotation speed of said vehicular wheel;
    first means for detecting a predetermined vehicular braking condition satisfying a predetermined anti-skid brake control condition for initiating anti-skid control operation;
    second means for latching a first wheel speed indicative value corresponding to said wheel speed indicative sensor signal value at a predetermined timing in each skid cycle and periodically latching a second wheel speed indicative value corresponding to said wheel speed indicative sensor signal value, for deriving a gradient of vehicular speed on the basis of said first and second wheel speed indicative sensor signal values and an interval of occurrences of latching of said first and second wheel speed indicative values;
    third means for deriving a time dependent vehicular speed variation datum by integrating said gradient of vehicular speed;
    fourth means for deriving a projected vehicular speed representative datum based on said first wheel speed indicative value and said time dependent vehicular speed variation datum; and
    fifth means for detecting said wheel speed indicative sensor signal value in a predetermined relationship with said projected vehicular speed representative datum for generating a reset signal for resetting said time dependent vehicular speed variation datum;
    sixth means for controlling said pressure adjusting means between said first and second modes for maintaining said rotation speed of said vehicular wheel in a predetermined optimal relationship with said projected vehicular speed representative datum.

17. An anti-skid brake control system as set forth in claim 16, which further comprises a seventh means for monitoring preselected gradient correction factor for deriving a correction value based thereon for modifying said gradient of vehicular speed with said correction value.

18. An anti-skid brake control system as set forth in claim 17, wherein said seventh means monitors braking pressure in said braking force generating means for deriving said correction value based thereon.

19. An anti-skid brake control system as set forth in claim 18, wherein said fifth means detects said wheel speed indicative sensor signal value within a predetermined range defined about said projected vehicular speed representative datum.

20. An anti-skid brake control system as set forth in claim 19, wherein said fifth means defines said predetermined range taking said projected vehicular speed representative datum as a center value.

21. An anti-skid brake control system for an automotive brake system comprising:
    a hydraulic brake circuit comprising means for building up braking fluid pressure according to operational magnitude of a manually operable braking member and braking force generating means, associated with a vehicular wheel, for generating braking force to decelerate said vehicular wheel;
    pressure adjusting means, disposed within said hydraulic circuit, for adjusting pressure of a working fluid to be delivered to said braking force generating means, said pressure adjusting means being operable at least in a first mode for increasing braking pressure in said braking force generating means and in a second mode for decreasing said braking pressure;
    sensor means for monitoring rotation speed of said vehicular wheel to produce a wheel speed indicative sensor signal value representative of said rotation speed of said vehicular wheel;
    first means for detecting a predetermined vehicular braking condition satisfying a predetermined anti-skid brake control condition for initiating anti-skid control operation;
    second means for latching a first wheel speed indicative value corresponding to said wheel speed indicative sensor signal value at a predetermined timing in each skid cycle and periodically latching a second wheel speed indicative value corresponding to said wheel speed indicative value, for deriving a gradient of vehicular speed on the basis of said first and second wheel speed indicative values and an interval of occurrences of latching of said first and second wheel speed indicative values;
    second deriving means for deriving a time dependent vehicular speed variation datum by integrating said gradient of vehicular speed;
    third means for deriving a projected vehicular speed representative data based on said first and second wheel speed indicative values and said time dependent vehicular speed variation datum; and fourth means for detecting said wheel speed indicative sensor signal value in a predetermined relationship with said projected vehicular speed representative datum for generating a reset signal for resetting said time dependent vehicular speed variation datum;

fifth means for monitoring a preselected gradient correction factor for deriving a correction value based thereon for modifying said gradient of vehicular speed with said correction value;

sixth means for monitoring road friction varying across a predetermined road friction criterion to operate said second means for updating said first wheel speed indicative value with said second wheel speed indicative value;

seventh means for controlling said pressure adjusting means between said first and second modes for maintaining the rotation speed of said vehicular wheel in a predetermined optimal relationship with said projected vehicular speed representative datum.

* * * * *